US009630320B1

United States Patent
Konolige et al.

(10) Patent No.: US 9,630,320 B1
(45) Date of Patent: *Apr. 25, 2017

(54) DETECTION AND RECONSTRUCTION OF AN ENVIRONMENT TO FACILITATE ROBOTIC INTERACTION WITH THE ENVIRONMENT

(71) Applicant: Industrial Perception, Inc., Mountain View, CA (US)

(72) Inventors: Kurt Konolige, Menlo Park, CA (US); Ethan Rublee, Mountain View, CA (US); Stefan Hinterstoisser, Munich (DE); Troy Straszheim, Palo Alto, CA (US); Gary Bradski, Palo Alto, CA (US); Hauke Malte Strasdat, San Francisco, CA (US)

(73) Assignee: Industrial Perception, Inc., Mountain View, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/793,246

(22) Filed: Jul. 7, 2015

Related U.S. Application Data

(63) Continuation of application No. 14/212,328, filed on Mar. 14, 2014, now Pat. No. 9,102,055.

(Continued)

(51) Int. Cl.
G05B 19/04 (2006.01)
G05B 19/18 (2006.01)
(Continued)

(52) U.S. Cl.
CPC ............. B25J 9/163 (2013.01); B25J 9/1697 (2013.01); G06T 7/0065 (2013.01);
(Continued)

(58) Field of Classification Search
CPC ............... B25J 9/1679; B25J 9/1697; G05B 2219/39508; G05B 2219/40014
(Continued)

(56) References Cited

U.S. PATENT DOCUMENTS

| 4,831,549 A | 5/1989 | Red et al. |
| 5,403,140 A * | 4/1995 | Carmichael ........ G11B 15/6835 250/559.06 |

(Continued)

FOREIGN PATENT DOCUMENTS

| DE | 10324755 | 9/2004 |
| EP | 2156927 | 2/2010 |

(Continued)

OTHER PUBLICATIONS

Agarwal, Sameer, Mierle, Keir, and others: Ceres Solver. http://code.google.com/p/ceres-solver, last accessed Apr. 22, 2014, 2 pages.

(Continued)

*Primary Examiner* — Dalena Tran
*Assistant Examiner* — Jorge Peche
(74) *Attorney, Agent, or Firm* — McDonnell Boehnen Hulbert & Berghoff LLP

(57) ABSTRACT

Methods and systems for detecting and reconstructing environments to facilitate robotic interaction with such environments are described. An example method may involve determining a three-dimensional (3D) virtual environment representative of a physical environment of the robotic manipulator including a plurality of 3D virtual objects corresponding to respective physical objects in the physical environment. The method may then involve determining two-dimensional (2D) images of the virtual environment including 2D depth maps. The method may then involve determining portions of the 2D images that correspond to a (Continued)

given one or more physical objects. The method may then involve determining, based on the portions and the 2D depth maps, 3D models corresponding to the portions. The method may then involve, based on the 3D models, selecting a physical object from the given one or more physical objects. The method may then involve providing an instruction to the robotic manipulator to move that object.

20 Claims, 13 Drawing Sheets

Related U.S. Application Data

(60) Provisional application No. 61/793,151, filed on Mar. 15, 2013, provisional application No. 61/798,425, filed on Mar. 15, 2013, provisional application No. 61/798,564, filed on Mar. 15, 2013, provisional application No. 61/798,505, filed on Mar. 15, 2013.

(51) Int. Cl.
*B25J 9/16* (2006.01)
*G06T 19/00* (2011.01)
*G06T 7/00* (2017.01)

(52) U.S. Cl.
CPC .. *G06T 19/003* (2013.01); *G05B 2219/39391* (2013.01); *G05B 2219/40543* (2013.01); *G06T 2200/04* (2013.01)

(58) Field of Classification Search
USPC ............. 700/253, 258, 259; 901/1, 8, 46, 47
See application file for complete search history.

(56) References Cited

U.S. PATENT DOCUMENTS

| | | | |
|---|---|---|---|
| 5,541,485 A | | 7/1996 | Teichmann et al. |
| 5,992,751 A | | 11/1999 | Laser |
| 6,493,607 B1 | | 12/2002 | Bourne et al. |
| 6,614,928 B1 | | 9/2003 | Chung et al. |
| 6,760,488 B1 | * | 7/2004 | Moura .................. G06T 7/0071 345/419 |
| 6,944,324 B2 | | 9/2005 | Tran et al. |
| 7,099,745 B2 | | 8/2006 | Ebert |
| 7,587,082 B1 | | 9/2009 | Rudin et al. |
| 7,809,158 B2 | | 10/2010 | Carpenter et al. |
| 7,818,091 B2 | | 10/2010 | Kazi et al. |
| 7,957,583 B2 | | 6/2011 | Boca et al. |
| 7,967,543 B2 | | 6/2011 | Criswell et al. |
| 8,108,072 B2 | | 1/2012 | Zhao et al. |
| 8,229,595 B2 | | 7/2012 | Seelinger et al. |
| 8,286,877 B2 | | 10/2012 | Olmstead |
| 8,306,314 B2 | | 11/2012 | Tuzel et al. |
| 8,306,663 B2 | | 11/2012 | Wickham |
| 8,360,318 B2 | | 1/2013 | Reynolds et al. |
| 8,379,014 B2 | | 2/2013 | Wiedemann et al. |
| 8,411,929 B2 | | 4/2013 | Silver |
| 8,538,579 B2 | | 9/2013 | Cottone et al. |
| 8,559,699 B2 | * | 10/2013 | Boca .................. B25J 9/1679 382/153 |
| 8,600,161 B2 | | 12/2013 | Simon et al. |
| 8,988,494 B2 | * | 3/2015 | Imai .................. H04N 13/0011 348/42 |
| 2002/0150450 A1 | | 10/2002 | Bevirt et al. |
| 2005/0091019 A1 | * | 4/2005 | Clavadetscher ... H04N 13/0275 703/8 |
| 2008/0279446 A1 | | 11/2008 | Hassebrook et al. |
| 2008/0300723 A1 | | 12/2008 | Ban et al. |
| 2009/0096790 A1 | * | 4/2009 | Wiedemann ....... G06K 9/00201 345/427 |
| 2009/0102841 A1 | * | 4/2009 | Clavadetscher ........ G06T 15/20 345/420 |
| 2009/0118864 A1 | | 5/2009 | Eldridge et al. |
| 2010/0092267 A1 | | 4/2010 | Najdovski et al. |
| 2010/0286827 A1 | | 11/2010 | Franzius et al. |
| 2010/0303337 A1 | * | 12/2010 | Wallack ................. B25J 9/1697 382/154 |
| 2011/0122231 A1 | * | 5/2011 | Fujieda ................. G06T 7/0075 348/47 |
| 2011/0320039 A1 | | 12/2011 | Hsu et al. |
| 2012/0095322 A1 | | 4/2012 | Tsekos et al. |
| 2012/0147149 A1 | * | 6/2012 | Liu ........................ G06T 7/0046 348/50 |
| 2012/0148145 A1 | * | 6/2012 | Liu ........................ G06T 7/0075 382/154 |
| 2012/0239194 A1 | | 9/2012 | Kagawa |
| 2012/0253507 A1 | | 10/2012 | Eldershaw et al. |
| 2012/0294510 A1 | | 11/2012 | Zhang et al. |
| 2013/0010081 A1 | | 1/2013 | Tenney et al. |
| 2013/0041508 A1 | | 2/2013 | Hu et al. |
| 2013/0147944 A1 | | 6/2013 | Zhang et al. |
| 2013/0151007 A1 | | 6/2013 | Valpola et al. |
| 2013/0335535 A1 | | 12/2013 | Kane et al. |
| 2013/0345870 A1 | | 12/2013 | Buehler et al. |
| 2014/0012415 A1 | | 1/2014 | Benaim et al. |
| 2014/0019392 A1 | | 1/2014 | Buibas |
| 2014/0088748 A1 | | 3/2014 | Woodtli et al. |
| 2015/0217451 A1 | * | 8/2015 | Harada .................. B25J 9/1612 700/253 |

FOREIGN PATENT DOCUMENTS

| | | |
|---|---|---|
| WO | 2007/050776 | 5/2007 |
| WO | 2013/065003 | 5/2013 |

OTHER PUBLICATIONS

Curless, Brian et al., "A Volumetric Method for Building Complex Models from Range Images," Proceedings of the 23rd annual conference on Computer Graphics and Interactive Techniques, ACM, New York, New York, Aug. 4-9, 1996, pp. 303-312.
Davis, James et al., "Spacetime Stereo: A Unifying Framework for Depth from Triangulation," IEEE Transactions on Pattern Analysis and Machine Intelligence, Feb. 2005, pp. 296-302, vol. 27, No. 2.
Greene, D. H., "The decomposition of polygons into convex parts," in Computational Geometry, ser. Adv. Comput. Res., F. P. Preparata, Ed. Greenwich, CT: JAI Press, 1983, pp. 235-259, vol. 1.
Hoppe, H. et al., Surface Reconstuction from Unorganized Points, Computer Graphics (SIGGRAPH'92 proceedings), Jul. 1992, pp. 71-78, vol. 26, No. 2.
Jimenez, P. et al., "3D Collision Detection: a Survey," Computers & Graphics, 2001, pp. 269-285, vol. 25, No. 2.
John, J. Craig. "Introduction to robotics: mechanics and control," Addison-Wesley Publishing Company, Inc., Reading, MA, 1989, Chapters 3, 4 and 7, pp. 68-151 and 227-261.
Konolige, Kurt, "Projected Texture Stereo," Proceedings of the 2010 IEEE International Conference on Robotics and Automation (ICRA), May 3-7, 2010, p. 148-155.
Kuffner, J. "RRT-connect: An Efficient Approach to Single-Query Path Planning", IEEE International Conference on Robotics and Automation, 2000, pp. 1-7.
Lorensen et al., "Marching Cubes: A High Resolution 3D Surface Construction Algorithm," Computer Graphics, Jul. 1987, p. 163-169, vol. 21, No. 4.
Marns, Jack, Automated robotic truck loader optimizes shipping space, Smart Packaging, Jan. 1, 2012, http://www.packagingdigest.com/smart-packaging/automated-robotic-truck-loader-optimizes-shipping-space.
Newcombe et al., "KinectFusion: Real-Time Dense Surface Mapping and Tracking," Proceedings of the 2011 10th IEEE International Symposium on Mixed and Augmented Reality, IEEE Computer Society, Washington, DC, 2011, p. 127-136.
Nieβner, M. et al., "Real-time 3D Reconstruction at Scale using Voxel Hashing," ACM Transactions on Graphics (TOG), 2013.
Okutomi et al., "A Multiple-Baseline Stereo," IEEE Transactions on Pattern Analysis and Machine Intelligence, Apr. 1993, pp. 353-363, vol. 15, No. 4.

(56) References Cited

OTHER PUBLICATIONS

Schulman, John et al., "Finding Locally Optimal, Collision-Free Trajectories with Sequential Convex Optimization," Robotics: Science and Systems (RSS), 2013, 10 pages.
Tsai et al., "A Single-Pixel Wireless Contact Lens Display," IEEE Transactions on Robotics and Automation, 1989, pp. 345-358.

* cited by examiner

DETECTION AND RECONSTRUCTION OF AN ENVIRONMENT TO FACILITATE ROBOTIC INTERACTION WITH THE ENVIRONMENT

CROSS-REFERENCE TO RELATED APPLICATIONS

The present application is a continuation of U.S. patent application Ser. No. 14/212,328, filed on Mar. 14, 2014 and entitled "Detection and Reconstruction of an Environment to Facilitate Robotic Interaction with the Environment," which claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present application discloses embodiments that relate to detection and reconstruction of an environment in order to facilitate interaction with the environment by a robotic device. In one aspect, the present application describes a method. The method may involve determining a three-dimensional (3D) virtual environment based on data received from one or more sensors, the 3D virtual environment being representative of a physical environment of a robotic manipulator including a plurality of 3D virtual objects corresponding to respective physical objects in the physical environment. The method may further involve determining one or more two-dimensional (2D) images of the 3D virtual environment, where the one or more 2D images include respective 2D depth maps representative of distances between respective surfaces of the physical objects and a reference plane associated with a perspective of the one or more sensors. The method may further involve determining one or more portions of the one or more 2D images corresponding to a given one or more physical objects. The method may further involve, based on the determined one or more portions of the one or more 2D images and further based on portions of the 2D depth maps associated with the given one or more physical objects, determining 3D models corresponding to respective determined portions of the one or more 2D images. The method may further involve, based on the determined 3D models, selecting a particular physical object from the given one or more physical objects. The method may further involve providing an instruction to the robotic manipulator to move the particular physical object.

In another aspect, the present application describes a non-transitory computer readable medium having stored thereon instructions that, upon execution by a computing device, cause the computing device to perform functions. The functions may include determining a 3D virtual environment based on data received from one or more sensors, the 3D virtual environment being representative of a physical environment of a robotic manipulator including a plurality of 3D virtual objects corresponding to respective physical objects in the physical environment. The functions may further include determining one or more two-dimensional (2D) images of the 3D virtual environment, where the one or more 2D images include respective 2D depth maps representative of distances between respective surfaces of the physical objects and a reference plane associated with a perspective of the one or more sensors. The functions may further include determining one or more portions of the one or more 2D images corresponding to a given one or more physical objects. The functions may further include, based on the determined one or more portions of the one or more 2D images and further based on portions of the 2D depth maps associated with the given one or more physical objects, determining 3D models corresponding to respective determined portions of the one or more 2D images. The functions may further include, based on the determined 3D models, selecting a particular physical object from the given one or more physical objects. The functions may further include providing an instruction to the robotic manipulator to move the particular physical object.

In still another aspect, the present application describes a system. The system may include a robotic manipulator, one or more sensors, at least one processor, and data storage comprising instructions executable by the at least one processor to cause the system to perform functions. The functions may include determining a 3D virtual environment based on data received from the one or more sensors, the 3D virtual environment being representative of a physical environment of the robotic manipulator including a plurality of 3D virtual objects corresponding to respective physical objects in the physical environment. The functions may further include determining one or more 2D images of the 3D virtual environment, where the one or more 2D images include respective 2D depth maps representative of distances between respective surfaces of the physical objects and a reference plane associated with a perspective of the one or more sensors. The functions may further include determining one or more portions of the one or more 2D images corresponding to a given one or more physical objects. The functions may further include, based on the determined one or more portions of the one or more 2D images and further based on portions of the 2D depth maps associated with the given one or more physical objects, determining 3D models corresponding to respective determined portions of the one or more 2D images. The functions may further include, based on the determined 3D models, selecting a particular physical object from the given one or more physical objects. The functions may further include providing an instruction to the robotic manipulator to move the particular physical object.

In yet another aspect, a system is provided that includes a means for determining a 3D virtual environment based on data received from one or more sensors, the 3D virtual environment being representative of a physical environment of a robotic manipulator including a plurality of 3D virtual objects corresponding to respective physical objects in the physical environment. The system may further include a means for determining one or more 2D images of the 3D virtual environment, where the one or more 2D images include respective 2D depth maps representative of distances between respective surfaces of the physical objects and a reference plane associated with a perspective of the one or more sensors. The system may further include a means for determining one or more portions of the one or more 2D images corresponding to a given one or more physical objects. The system may further include a means for, based on the determined one or more portions of the one or more 2D images and further based on portions of the 2D depth maps associated with the given one or more physical objects, determining 3D models corresponding to respective determined portions of the one or more 2D images. The system may further include a means for, based on the determined 3D models, selecting a particular physical object from the given one or more physical objects. The system may further include a means for providing an instruction to the robotic manipulator to move the particular physical object.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
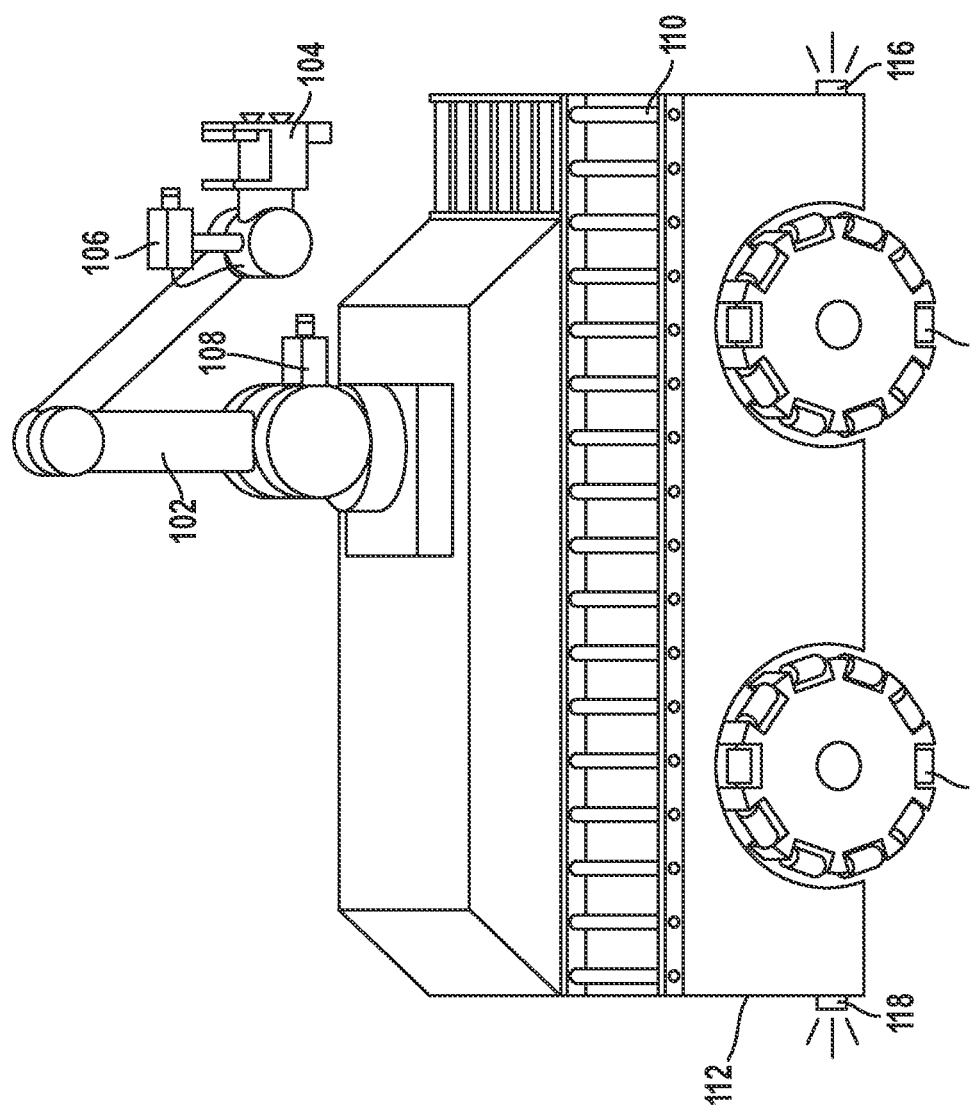
FIG. 1A shows a robotic arm mounted on a moveable cart, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting.

It may be readily understood that certain aspects of the disclosed systems and methods can be arranged and combined in a wide variety of different configurations, all of which are contemplated herein.

In the following description, the terms "sensor," "camera," or "optical sensor" may be used interchangeably and may refer to device or devices (mono or stereo arrangements) configured to perform 3D image sensing, 3D depth sensing, 2D image sensing, 2D depth sensing (i.e., 2D image and corresponding depth map), and/or other types of sensing of a physical environment of the device.

Further, in the following description, the term "robotic manipulator" may be used to describe one or more robotic devices, such as a robotic arm, configured to grab, move, or otherwise manipulate physical objects, such as boxes.

In some scenarios, a system configured to load, unload, or otherwise move groups of physical objects such as boxes may implement various methods in order to analyze the system's environment and determine how the system should interact with the groups of physical objects. As an example, the system comprising a robotic arm may construct a 3D virtual environment of a pallet of boxes as a first step in determining a plan for how to direct the robotic arm to pick up boxes and unload the pallet. Similar examples may be used as a robotic arm is being used to load boxes onto a pallet or other environment as well. Other physical objects are also possible.

In some embodiments, a 3D virtual environment comprising 3D representations of the boxes may be projected orthographically as substantially-planar views (e.g., "facades") of the boxes, which may yield an accurate scale model looking front-on from the robotic arms' point of view. These orthographically-projected views may be represented as a 2D depth map with varying colors corresponding to how far away each point of the different box surfaces are from a reference plane from any given viewpoint, where the reference plane may be associated with the robotic device and/or with sensors coupled to (or not coupled to) the robotic device. Examples of these orthographically-projected views may be a wall of boxes in a truck, the top row of a pallet stack of boxes, a top-down view of a pallet stack of boxes, etc. This 2D representation of the environment may then allow for a computing device to parse the representations and determine points of interest, such as a particular box to pick up and unload off the pallet of boxes and a particular location on the particular box at which to grip the particular box.

In some embodiments, the system may search the orthographically-projected views for convex and polygonic "portions" (e.g., borders, outlines, perimeters, or the like) corresponding to surfaces of the boxes from particular views. In particular, the system may search for substantially quadrilateral portions, or perhaps, more specifically, substantially parallelogramic portions, in order to facilitate faster loading/unloading of the boxes. The system may also take into account the 2D depth map in order to determine the portions, and perhaps also in order to determine which box is closest to the robotic arm and an ideal candidate for the next box to be grabbed from the stack of boxes. Other geometric characteristics of the group of boxes (and/or individual boxes) may be taken into account as well to facilitate faster or otherwise more ideal loading/unloading of the boxes.

In some embodiments, the system may have stored information associated with the stack of boxes and/or individual boxes before beginning to scan the environment and load/unload the boxes. For instance, the system may look only for quadrilateral portions that fall within a predetermined range of dimensions, the range being based on a known range of sizes of the boxes in the environment. Alternatively, the system may learn information about the stack of boxes or other physical objects as it continues to interact with the stack, such as average dimensions of the objects.

In some embodiments, the one or more sensors may take the form of multiple cameras, since any single camera view of the environment may suffer occlusions at certain points of view. Accordingly, in such embodiments, multiple views captured by the multiple cameras may be combined to create a single facade of the boxes.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap-around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
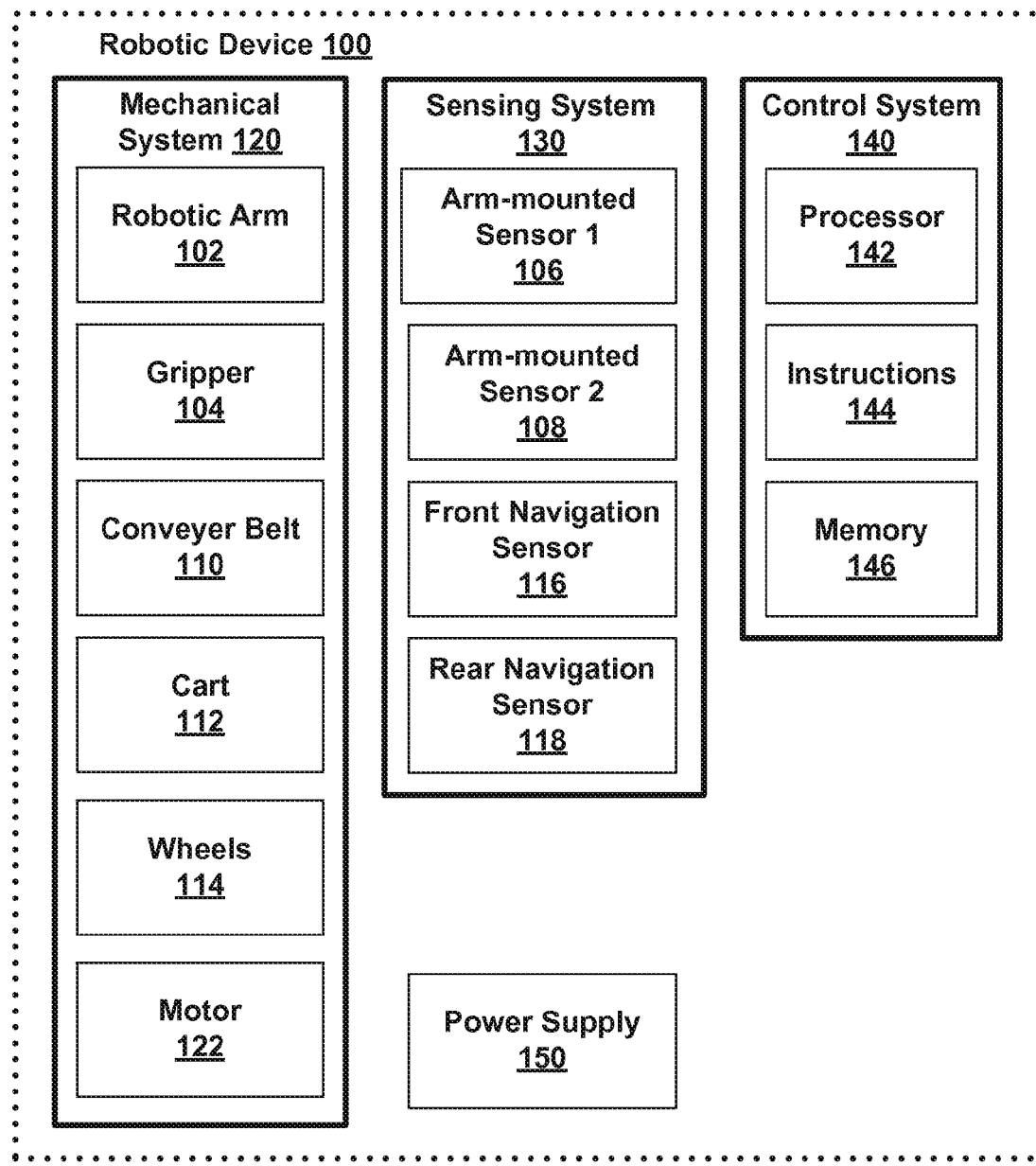
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
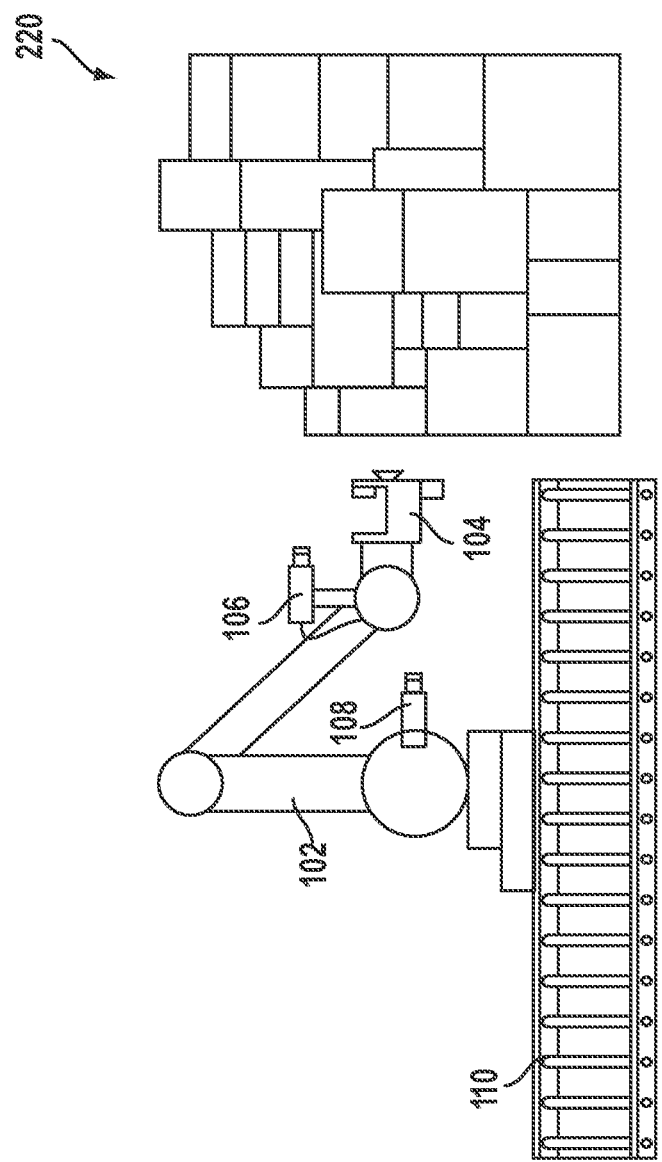
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
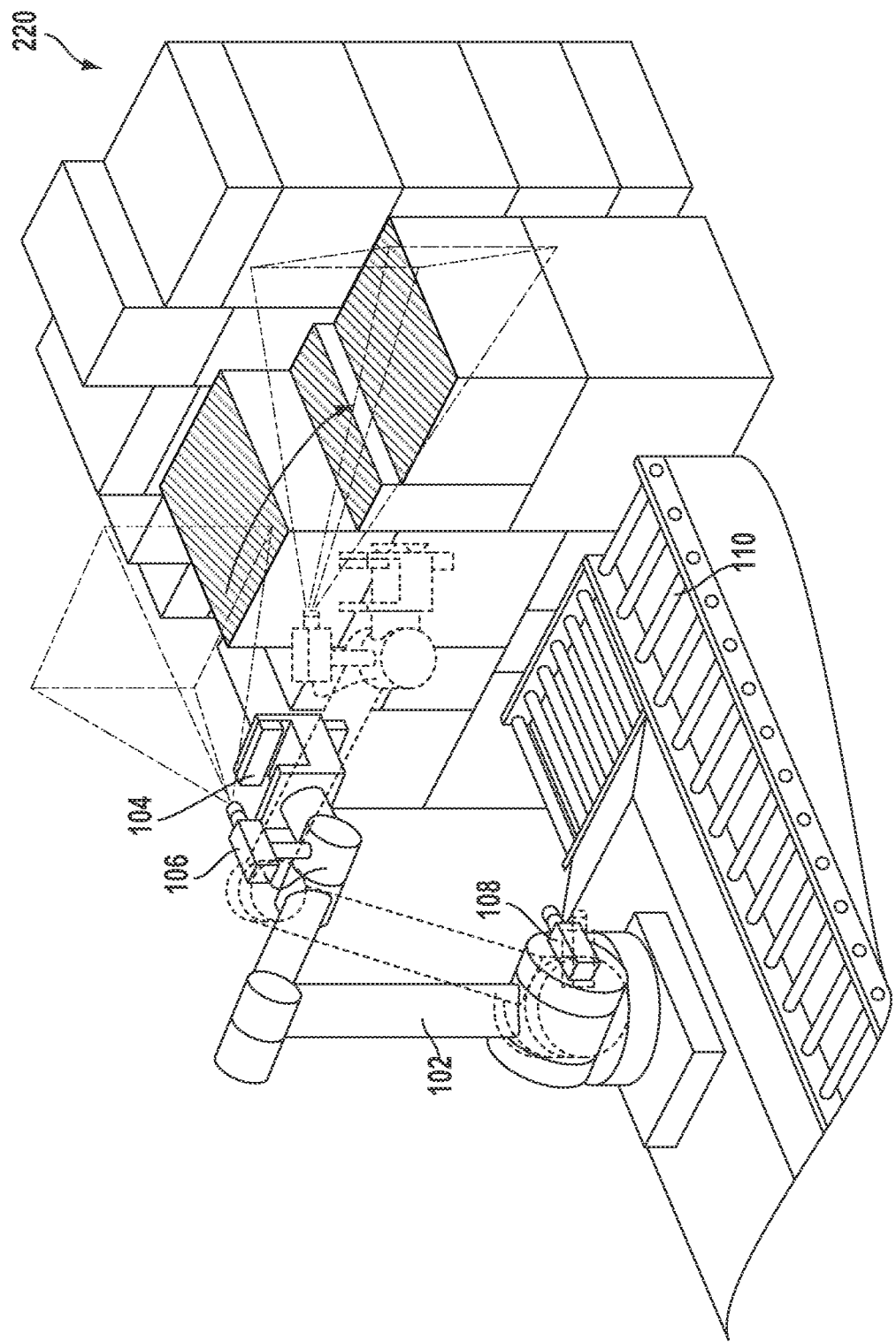
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal may have a geometric form of a cylinder and a tire may have a geometric form of a torus. Example systems may leverage this trait of certain objects in order model them and/or determine how to motion plan for the objects. For instance, known templates of certain shapes can be used to detect or refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
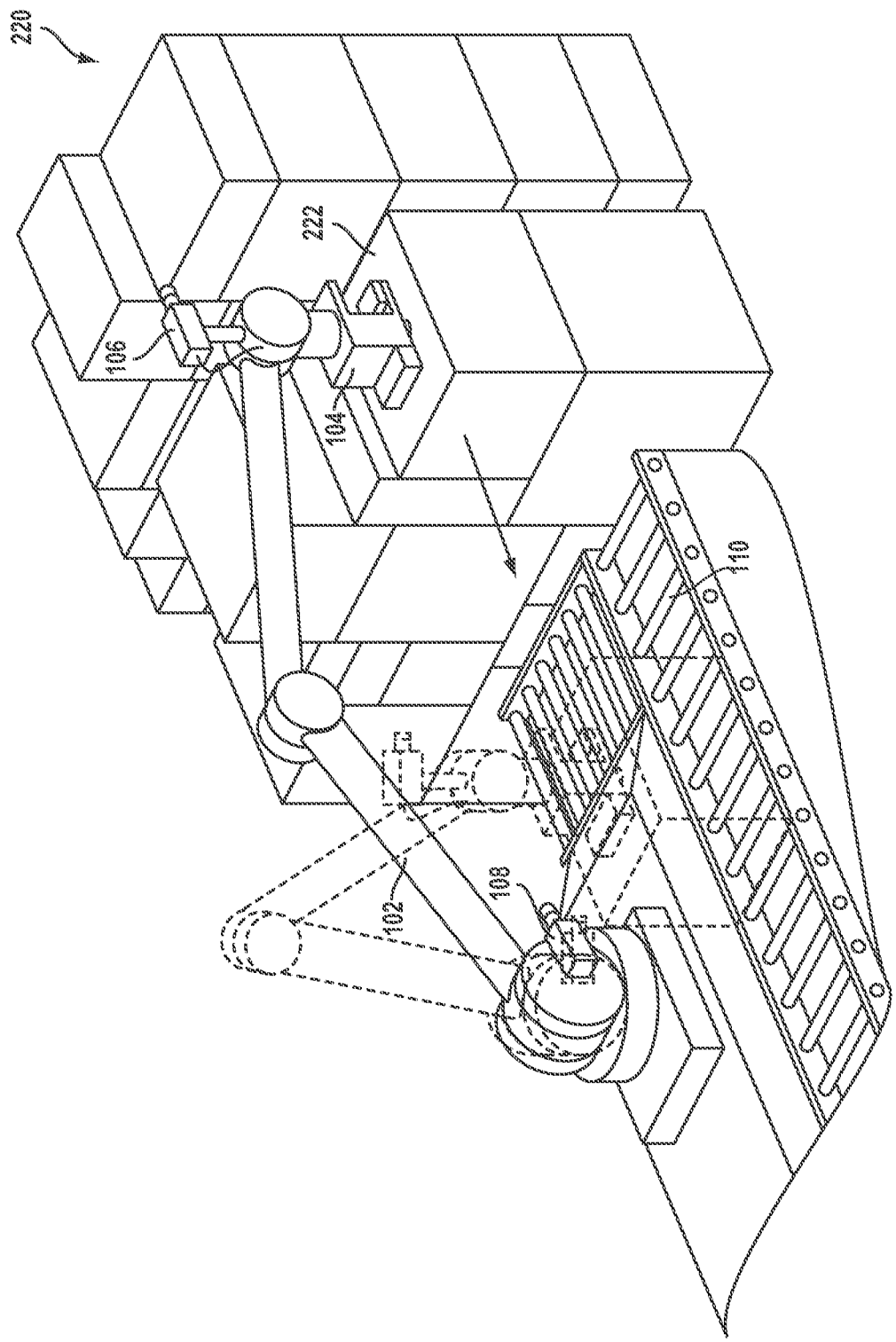
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information, as noted above. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200, etc.) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
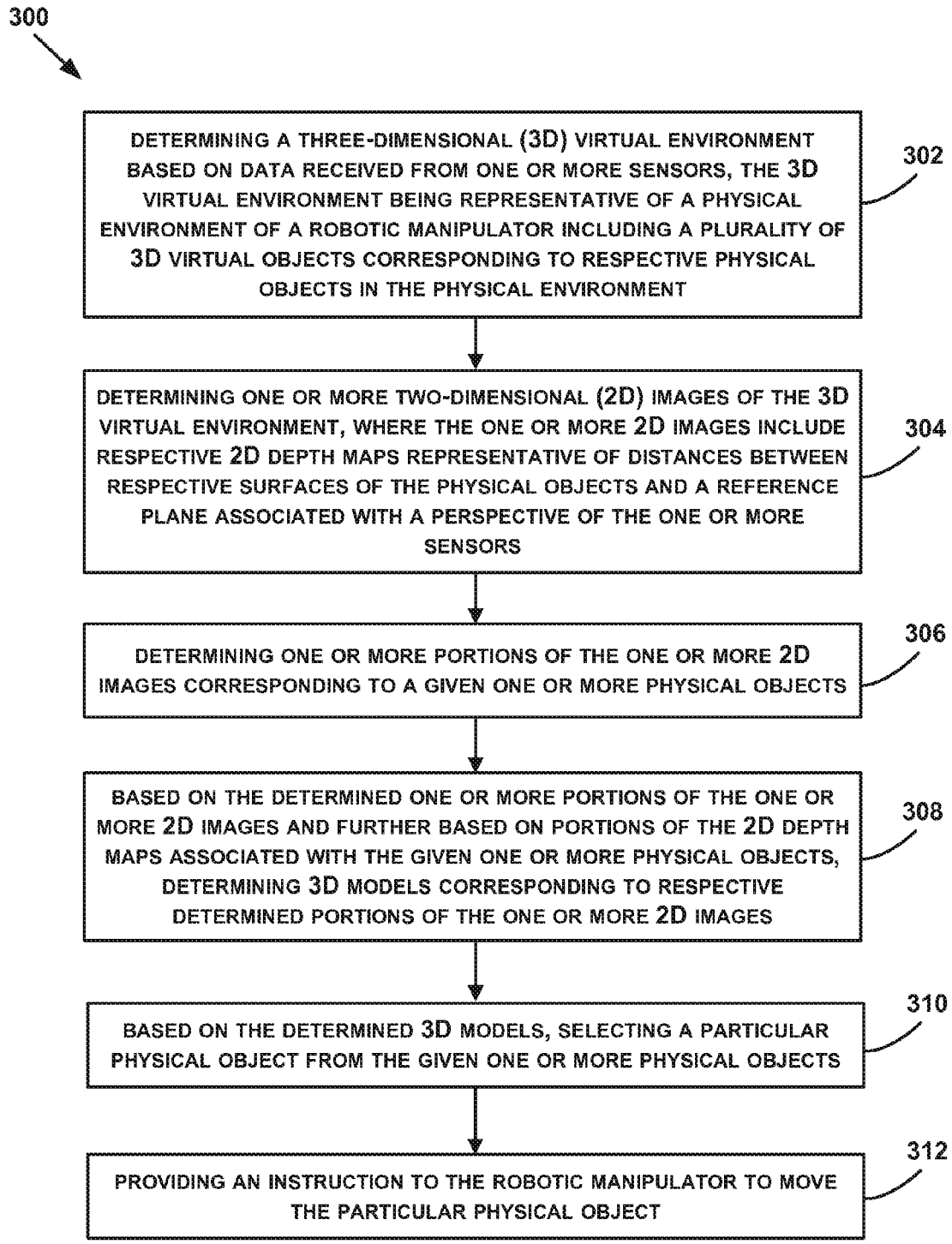
FIG. 3 is a flow chart of an example method, in accordance with at least some embodiments described herein.

FIG. 3 is a flow chart of an example method for detecting, reconstructing, and facilitating robotic interaction with an environment, in accordance with at least some embodiments described herein. Method 300 shown in FIG. 3 presents an embodiment of a method that, for example, could be used with the systems shown in FIGS. 1A-2C, for example, or may be performed by a combination of any components of in FIGS. 1A-2C. In addition, such an embodiment of a method could be carried out in accordance with the systems and aspects illustrated in FIGS. 4A-4D and FIGS. 5A-5C. Method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Functions of the method 300 may be fully performed by a computing device, or may be distributed across multiple computing devices and/or a server. In some examples, the computing device may receive information from sensors or other components coupled to the computing device, or where the computing device is a server the information can be received from another device that collects the information. The computing device could further communicate with a server to determine dimensions of physical objects, for example, where the server may include a database of accumulated determined box dimensions and/or other information that may facilitate the performance of the method 300.

At block 302, the method 300 includes determining 3D virtual environment based on data received from one or more sensors, the 3D virtual environment being representative of a physical environment of a robotic manipulator including a plurality of 3D virtual objects corresponding to respective physical objects in the physical environment. As noted above, the robotic manipulator may take the form of a robotic arm, and the physical objects may take the form of cuboid-shaped (or other shaped) objects, such as boxes, that are stacked in the physical environment.

At block 304, the method 300 includes determining one or more 2D images of the 3D virtual environment, where the one or more 2D images include respective 2D depth maps representative of distances between respective surfaces of the physical objects and a reference plane associated with a perspective of the one or more sensors. In some examples, the 2D images may include various facades of a stack of boxes (i.e., a near-planar group of boxes) from different viewpoints. For instance, when the physical objects are a stacked pallet of boxes in the physical environment, the 2D images may include at least one side view facade of the stacked pallet of boxes, at least one top-down view facade of the stacked pallet of boxes, and/or other variations on these viewpoints (i.e., perspective views).

In some examples, the 2D images may include 2D projections of the 3D virtual environment, such as orthographic projections of the 3D virtual environment. To determine the facade, some or all of the 3D data points (i.e., 3D point cloud) that make up the 3D virtual environment may be projected two-dimensionally onto the reference plane associated with the perspective of the sensors which detected the 3D virtual environment. For instance, the reference plane may be substantially orthogonal to a surface on which the physical objects are placed and/or substantially parallel to a nearby wall or other vertical surface in the physical environment. The reference plane may intersect some or all of the boxes, or may be separate from the boxes (i.e., behind the boxes, such as parallel to a nearby wall). In other examples, the reference plane may be angled and orthogonal to a sightline of one or more of the sensors when the given sensor viewpoint of the facade is a perspective viewpoint.

At block 306, the method includes determining one or more portions of the one or more 2D images corresponding to a given one or more physical objects. At this stage in the method, a computing device may segment one or more of the 2D images into portions that resemble convex polygons, in an attempt to distinguish at least one of the physical objects from the remainder of the facade. In scenarios where the physical objects are known to be cuboid-shaped objects, the computing device may narrow the segmentation to substantially quadrilateral portions, or perhaps even substantially parallelogramic portions.

To facilitate more accurate segmentation and determination of the portions of the 2D images, the computing device may take into account multiple factors. For instance, at least one edge of a given portion may be determined based on boundaries between substantially proximate physical objects. Depending on how close physical objects are to each other in the physical environment, the 2D depth map of the objects may indicate edges/boundaries of the objects, where the depth component may show one or more points on the 2D image indicative of the space between two or more objects. The computing device may detect these edges and use them as one or more edges of a given portion that corresponds to the physical object that includes the detected edges. However, in some scenarios, edges of the physical objects may be occluded or otherwise not distinguishable in the 2D depth map. In such scenarios, the computing device may cause the robotic manipulator to nudge or otherwise move the physical objects in order to better emphasize the boundaries between the physical objects in subsequent determined 2D images and depth maps. The computing device may perform other functions as well in order to rectify occluded or otherwise indistinguishable edges of objects.

Further, at least one edge of a given portion may be determined based on a predetermined range of dimensions of the physical objects. For instance, in some examples, the computing device may estimate a length of an edge to be a value that falls between two known dimensions of the physical objects. The predetermined range of dimensions of the physical objects may be bound by one or more of the following: a minimum height of the physical objects, a minimum length of the physical objects, a minimum width of the physical objects, an average height of the physical objects, an average length of the physical objects, an average width of the physical objects, a maximum height of the physical objects, a maximum length of the physical objects, and a maximum width of the physical objects. Other predetermined bounds and ranges may be used to determine the portions of the 2D images.

In some examples, the computing device may have determined or may otherwise have stored information associated with at least one of the physical objects in the physical environment before the functions at block 306 are performed. For instance, the computing device or system comprising the computing device and robotic manipulator may have previously interacted with the physical objects in such a way as to measure one or more dimensions of each of the physical objects (e.g., scanning a barcode on each object to obtain and store information associated with each object). By these means or others means not described herein, the computing device may also determine other information associated with the physical objects, such as a weight of the at least one physical object, a respective transport structure on which to place the at least one physical object (e.g., a pallet, conveyor belt, etc.), a respective transport vehicle on which to place the at least one physical object (e.g., a truck), and an identifier of at least one other physical object in the physical environment at which to place the at least one physical object proximate to.

In other examples, the computing device (or system) may accumulate determined dimensions of the physical objects as the device or system continues to interact with the physical objects in the physical environment. Phrased another way, the device/system may define a range of dimensions after detecting and moving a portion of the physical objects in the physical environment. By way of example, when the robotic manipulator unloads a box from a stacked pallet of boxes, one or more sensors may measure dimensions of that box and the computing device may update a database including average dimensions or other information based on the measured dimensions of the boxes. The computing device may thus learn about the remaining boxes in the environment based on information gathered about the boxes that were previously in the environment and interacted with by the robotic manipulator.

As such, based on movement of other physical objects from the physical environment by the robotic manipulator before the movement of the eventual next physical object to be moved, based on portions of the 2D images corresponding to the other moved physical objects, and based on 3D models corresponding to the other moved physical objects (see block 308), the computing device may determine a range of dimensions of the other moved physical objects. The computing device may thus use this range of dimensions in order to determine one or more edges of the portions of the 2D images to facilitate detection and movement of the eventual next physical object.

Additionally or alternatively, the computing device may dynamically accumulate dimensions of the physical objects in the environment by analyzing the 3D virtual environment so as to estimate dimensions of the 3D virtual objects. Along these lines, sensors coupled to the robotic manipulator may determine dimensions of the physical objects as any initial scans are performed (e.g., the sensors perform one or more quick "sweep" scans of the objects) or may determine dimensions of objects as the robotic manipulator picks up a given object.

As a further example, the computing device may determine dimensions of the one or more portions based on templates of other portions (e.g., shapes) that were previously determined by the computing device or based on templates corresponding to known shapes (e.g., convex polygons) of varying dimensions so that the one or more portions include dimensions of the known shapes. Other methods for determining dimensions of the physical objects are possible as well.

In some examples of detection of physical objects—boxes, in particular—the computing device may identify line, corner, contour and plane features, and use these features in accordance with a method for box hypotheses generation. Such a method may use the orthographic projections of the depth, the normal and the color/intensity image generated from a 3D virtual reconstruction of an environment (e.g., facades). In these orthographic projections, boxes are observed as quadrilaterals, or parallelograms in particular. Such a method may be divided into different modules which are processed in successive order.

At the first module, a data preprocessing module, all planes which are skewed beyond a given threshold with respect to the one or more optical sensors may be filtered out. A plane associated with the floor on which the boxes are placed may also be filtered out. Then, the computing device may compute a multi-channel edge image for template matching that incorporates the orthographic normal, color and depth projection image (e.g., normal, color and depth maps) from the reconstructed 3D virtual environment. This may result in a multi-modal gradient orientation image and a corresponding magnitude image. To compute an edge map, the computing device may implement different weighting of the modalities. After computation of the edge map, the computing device may compute all the line, corner, contour, and plane features mentioned above using the normal, color, depth, multi-modal orientation and magnitude images.

At the next module, a box hypothesis generation module, one or more different types of box hypotheses generation approaches may be used. Each approach may use some basic dimension constraint checks initially, which check if a box violates predefined dimensions. If so, that box may be removed. One approach may be box hypothesis by plane feature. In this approach, the computing device may construct a parallelogram that is made up by one plane found within the current scene. If the plane is well explained by the box, and the box is at least partially covered by the plane, that plane may be used as a potential box hypothesis.

In another approach, box hypothesis may be performed using two diagonal opposite corner features. Namely, two diagonal opposite corner features that lie on the same plane may provide all necessary information to build up a parallelogram (by using the corner locations and their respective orientation of their four corner "arms" in total). As such, the computing device may use the underlying gradient orientation and magnitude values to optimize the orientation of the corner arms.

In still another approach, box hypothesis may be performed using two opposite corner features and a contour. Namely, two opposite corner features that lie on the same plane may serve as one baseline. This baseline and the corresponding opposite contour of the plane may serve as two parallel sides of a parallelogram. The other two sides may be provided by the intersection of the corner feature arms which are not incorporated into the baseline and the contour line. The result of the four sides may make up a particular parallelogram. The box hypothesis may consist of one previously detected plane, and may be invalid if there is more than one previously detected plane.

In yet another approach, box hypothesis may be performed using four line features. Namely, four line segments which are approximately perpendicular in 3D may comprise a parallelogram. Each line segment may be required to cover at least a certain percentage of the corresponding border of the resulting parallelogram in order for the computing device to determine that the given box hypothesis is valid. The box hypothesis may consist of one previously detected plane, and may be invalid if there is more than one previously detected plane.

At the next module, a verification and refinement module, the computing device may verify and refine each of the generated box hypotheses based on at least a portion of the available data and known constraints. In one example, the computing device may verify and refine a box hypothesis that was created by two diagonal corner features. In this example, the computing device may create a band around each side of the parallelogram that was created, where every possible line in the band may be evaluated. For each of those lines, the computing device may compute similarity scores (i.e., "verification scores") based on a dot product of the normal of the line and the computed multi-modal gradient noted above. Finally, the computing device may select one parallelogram out of all possible parallelograms where the sum of the similarity scores is maximal under all parallelograms. If the best parallelogram is above a certain threshold, the computing device may process it further. Otherwise, that parallelogram may be rejected. This similarity score may be used later as a confidence score during global reasoning.

In another example, the computing device may verify and refine a box hypothesis that was created by a plane. In this example, the computing device may apply the same verification score method as noted above with respect to the previous example. However, all box hypotheses that are rejected may not be discarded, but rather still used with a low confidence value.

In still another example, the computing device may verify and refine a box hypothesis that was created by two opposite corner features and a contour. First, the computing device may optimize the baseline by computing every possible line within a band around the baseline and using the line which is best supported by the data (as in the first verification example). Next, the computing device may project a location of the two corner features onto the optimized baseline in order to obtain a start and an end point. Then, the computing device may use that line and the corresponding normal of the underlying plane to recompute the orientation of the template arms. The intersection of the two new template arms and the contour may serve as two adjacent lines to the baseline. Both of those adjacent lines may also be refined (similar as the baseline). Their average intersection with the contour gives a parallelogram. The confidence value of this refined box is the similarity score of the baseline and the two adjacent lines. Using this method of verification, the computing device may reject such a refined box if the similarity score is too low or the fourth line is not much supported by the contour pixels (i.e. the contour pixels are too far away from the constructed fourth line). This similarity score may be used later as a confidence score during global reasoning.

In yet another approach, the computing device may verify and refine a box hypothesis that was created by four line segments. Here, the method of verification and refinement may be the same as the method for verification and refinement of a box hypothesis that was created by two diagonal corner features. The computing device may determine whether the refined boxes violate predetermined box dimension constraints and/or the perpendicularity of the box sides constraints. If the computing device determines that a refined box violates such constraints, the corresponding box may not be further considered.

At the next module, a background and plane coverage check module, in order to check consistency of all box hypotheses, the computing device may determine whether each box hypothesis covers a significant part of the background and/or more than just one plane. As such, boxes that cover a significant part and/or more than just one place are removed from consideration.

At the next module, an identity check module, the computing device may remove duplicate box hypotheses in order to speed up global reasoning. Namely, the computing device may remove exact duplicates and also may remove box hypotheses which are substantially close to other box hypotheses.

At the last module, a global reasoning module, the computing device determines a more clear interpretation of a given facade. By implementing this module, the computing device can avoid overlapping boxes in the final box detection results. First, however, the computing device may perform local reasoning. Namely, the computing device may determine, for each box, whether there is a significant smaller box that intersects this box and whose depth-only similarity score is high enough to assume that the smaller box is an actual box. When there is such a significant smaller box, the computing device may determine that the larger box is not an actual box and remove it from consideration.

For the global reasoning aspect, the computing device may first extract connected groups of boxes where a box belongs to one group if it occludes another box within the group or is occluded by another box within the group. Each box may only belong to one group. For each group the computing device may build a connected undirected graph where two nodes are connected if the two corresponding boxes don't overlap. The computing device may then attempt to find maximal cliques with this graph (i.e., subgraphs where each node (e.g., a box) is connected to all other nodes (e.g., other boxes)). Each clique may be weighted by the confidence value of the included boxes, by the area of the boxes, and by the number of boxes that belong to this clique (larger number means higher weighting). Lastly, the computing device may determine a sorting of all the weighted maximal cliques in decreasing order, and then use the one with the maximum score as a final global result. Other examples of detection of physical objects are possible as well.

At block 308, the method 300 includes, based on the determined one or more portions of the one or more 2D images and further based on portions of the 2D depth maps associated with the given one or more physical objects, determining 3D models corresponding to respective determined portions of the one or more 2D images. Here, the computing device may extrude 3D models out from the portions of the 2D images, where the extruded 3D models may have at least one dimension that is substantially identical to that of the corresponding portion. For instance, respective 3D models of the determined 3D models may include two parallel surfaces of an identical shape, where that shape is a shape of the respective determined portion of the one or more 2D images to which the respective 3D model corresponds.

By way of example, the computing device may determine, at the top of a facade of boxes, that there is a substantially square portion of the 2D image corresponding to that top box. Based on the portion of the 2D depth map that corresponds with that top box, and further based on other 3D modeling algorithms and functions, the computing device may create a 3D model which serves as an estimate of the size of the top box. The height and width of the box may be represented by the determined portion, and the computing device may estimate a length at which to extrude the 3D model out to. Further, the computing device may extrude out other 3D models corresponding to other perceived boxes in a stack of boxes, although, since it may be harder for the computing device to distinguish between boxes lower in the stack (see description above, and see FIGS. 5A-5C), the 3D models extruded out from those lower boxes may be less accurate representations of the actual lower boxes.

The computing device may determine the 3D models based on other factors as well. For instance, the computing device may determine the 3D models based on the predetermined range of dimensions of the physical objects described above. And, when the range of dimensions is determined based on previously-moved physical objects and based on those objects' corresponding 2D portions and 3D models, the 3D models for at least one object in the current facade of objects may be determined based on that range of dimensions. As an example, when a width and height of one or more of the objects are estimated dimensions of the portions of the 2D image, the computing device may extrude 3D models out from each of those portions at an average length that is substantially equal to an average length, maximum length, or minimum length of previous objects.

Furthermore, the computing device may be configured to determine the 3D models based on templates corresponding to known 3D geometric shapes and/or based on known 3D models, such as CAD models, mathematical models, and the like. Similarly, the computing device may be configured to first determine 3D models using one of the means described above, and then subsequently refine one or more of the determined 3D models based on such templates. By way of example, when the computing device has determined a set of 3D models that correspond to a set of portions of the 2D image (and at least partially correspond to the actual physical objects in the physical environment), the computing device may compare the determined 3D models to the known 3D geometric shapes or other 3D models and perhaps replace the determined 3D model with a like 3D geometric shape or like 3D model. Or, based on dimensions of the one or more portions of the 2D images, the computing device may search through a database or otherwise determine one or more basic 3D shapes (e.g., rectangular solid, cube, etc.) and/or one or more 3D CAD models, for instance, to be the 3D models that correspond to those portions of the 2D images. For instance, if the average length of a stack of boxes is approximately two meters, the computing device may use a basic 3D rectangular solid with a two-meter length and a width/height that is substantially the same as a given portion of the 2D image. Other examples are possible as well.

In some examples, templates of the known 3D shapes/models may include important marked points or features, or "fiducial markers." These fiducial markers may be used for various purposes. For instance, the fiducial markers may correspond to optimal grip points on a given object, so as to enable a robotic manipulator to grasp that object at the optimal grip points when the robotic manipulator moves that object. As another example, the fiducial markers may correspond to locations on an object at which the robotic manipulator should drill, adhere, or otherwise interact with that object. Fiducial markers may be used to point out other useful features of an object as well to facilitate interaction between that object and the system. As such, during model capture, humans or a computing device can mark the object that is being modeled with fiducial markers for future automatic detection of important points or features, or alternatively mark a constructed CAD model (or other type of model) in a viewing window, for instance. Subsequently, when the an object is detected and its pose matched to the CAD model, the fiducial markers may be present in the CAD model, and can be used for control of various operations such as picking or grasping the object, machining, painting, or gluing.

At block 310, the method 300 includes, based on the determined 3D models, selecting a particular physical object from the given one or more physical objects. And in a scenario where the determined 3D models are detected and/or refined using templates corresponding to known 3D geometric shapes and/or known 3D models, the selecting of the particular physical object may be performed based on those refined 3D models.

In some examples, the computing device selecting the particular physical object from the given one or more physical objects based on the determined 3D models may comprise the computing device selecting a physical object corresponding to a 3D model that includes at least three surfaces different from surfaces of the 3D model that are proximate to surfaces of other 3D models of the determined 3D models. Phrased another way, the computing device may generally seek to select physical objects that have a threshold high portion of their surfaces not directly proximate to other physical objects, thus making such objects more distinguishable and easier to detect from a facade. For instance, the computing device may look to select a determined 3D model that is on a top-corner of a stack of 3D models, thereby selecting a physical object on an end of a top row of a stack of physical objects.

Again, the computing device may start by selecting objects that are most distinguishable, such as those with less occluded edges, and then selecting subsequent objects that become more distinguishable as other objects are removed. As such, when the physical objects comprise a stacked pallet of physical objects within the physical environment, the computing device may select, as the particular physical object, an object on a top row of the stacked pallet closest in proximity to the robotic manipulator, an object closest to a far edge of the stacked pallet, an object that is highest-stacked, and/or other distinguishable objects.

It should be understood that the computing device may go through the process above, including segmenting the 2D images and extruding 3D models, repeatedly for each facade of boxes (i.e., go through multiple, different iterations) until the computing device determines that there is an appropriate physical object to select.

At block 312, the method 300 includes providing an instruction to the robotic manipulator to move the particular physical object. In some examples, the computing device may determine a location on the particular physical object at which to instruct the robotic manipulator to initiate movement of the particular physical object based on dimensions of the determined 3D model that corresponds to the particular object or based on other factors noted above. As such, the computing device may provide an instruction to the robotic manipulator to contact the particular physical object at the determined location on the particular physical object so as to initiate movement of the particular physical object. And, in similar examples, these determined locations may take the form of fiducial markers.

Generally, in a scenario where a 3D model was determined based on a given template representative of a known 3D model that included fiducial markers, the method 300 may further involve determining one or more features on the 3D model that corresponds to the selected particular physical object based on corresponding marked features in a given template representative of a known 3D model that was used to determine the 3D model that corresponds to the selected particular physical object. As such, the computing device may provide the instruction to the robotic manipulator to move the particular physical object based on the determined one or more features.

It should be understood that in some examples, including examples described above, the computing device may be configured to perform one or more functions of the method 300 in a respective predetermined time window.

Many different virtual environments, both 2D and 3D, built by using depth and visual cameras are possible. Such environments may be represented, for example, as point representations, surface representations, or volumetric representations. In one particular example, the computing device may implement a volumetric system, such as a Truncated Signed Distance Function (TSDF), which allows for efficient integration of depth images for a wider FOV and lower noise. Generally, the volume may be a virtual reconstruction of the environment in the form of a TSDF, which comprises implicit information about the surfaces present in the volume.

In some examples of volume integration, TSDF volume comprises a regular 3D grid containing a signed scalar field indicating the distance to the nearest depth point. For each depth pixel in an input image, a projected ray may be averaged into the volume, with a zero value in the cell exactly at the depth 3D point, positive values closer to the camera, and negative values further away. The computing device may integrate together successive depth images that are registered to this volume.

In such examples, the computing device may add information from a visual camera as well, in addition to the depth information, as noted above. To facilitate this, the visual camera may calibrated in accordance with the depth camera, and the depth image may be re-projected to the frame of the visual camera so that their images correspond to the same (visual camera) viewpoint. Then, at each point in the volume along the projecting ray, visual RGB information may also be averaged into the volume cells along the ray.

As a further example aspect of volume integration, each cell may also include information about whether that cell occurs at the edge of the projected depth/visual image. In a scenario where the computing device re-projects the volume to a height map, such information may be used to determine where there are "false edges" in the height map (i.e., edges that arise from the aperture edges of the input images).

As a further example aspect of volume integration, the computing device may take into account a confidence in the depth reading. For instance, readings that are further away from the camera, or that strike a surface at a glancing angle, are discounted by the computing device. As such, more confident information may have more of an effect during integration, which may improve the quality of the environment reconstruction.

In some aspects, the computing device may also subtract information, for example, when a box is removed or the environment changes for any other reason, and when new information contradicts the old information. The TSDF may handle situations such as this by gradually averaging in the new information, which can take a significant number of new views before older, invalid surfaces are removed. To facilitate quick removing of information, the computing device may implement one or more methods. In a first method, the computing device may have predetermined that it will be loading, unloading, or otherwise interacting with an object such as a box. For instance, the computing device may know a region of the box (e.g., the coordinates and dimensions of the box), and may erase this region from the TSDF, setting the region to a zero state. This erasure may cause errors, and thus, the computing device may gradually smooth the outlines of the removed box. In a second method, the computing device may enforce a strong erasure constraint on each ray that is projected into the volume. Instead of just changing the TSDF in the vicinity of the 3D depth point, the computing device may zero out all cells along the ray, from the camera to a certain distance in front of the 3D depth point. Such a process may cause the environment to change much more rapidly in dynamic situations, without ruining the integration of areas that are stable. Other example methods for quickly removing information from images are possible as well.

In some scenarios, the computing device may need to extract either 3D points or explicit surface information as the input to other algorithms (e.g., obstacle avoidance applications). To facilitate this, the computing device may implement one or more of several different algorithms. For instance, the computing device may project the volume TSDF onto a planar surface in the form of a height map, the height map being an image whose pixel values represent the distance of the nearest surface along a ray perpendicular to the surface (for orthographic projection), or through a focal point (pinhole projection).

In addition to the height map, the computing device can obtain a similar visual map by projection, since the TSDF contains RGBD values at each cell. Such a visual map may take the same format as the height map. Information in the height map may be color-coded by depth.

In an example application of height maps, the computing device may determine the location of boxes in the physical environment. Every face of a rectangular-sided box may be a planar segment that projects onto an orthographic height map as a parallelogram, as noted above. Thus, in order for the computing device to find rectangular box faces, the computing device may look for parallelograms in the height map using one or more of the methods described above (e.g., using line segments from both visual and depth height maps).

In another example application of height maps, the computing device may determine a suitable set of convex bodies to facilitate collision avoidance. The computing device may perform convex decomposition in 2D space rather than in 3D space, although convex decomposition in 3D space is possible as well. For instance, an example algorithm may first subdivide the height map into a set of planar regions. Then, each planar region may be divided into a set of 2D convex shapes. Finally, all 2D convex regions may be extruded away from the projecting plane to create convex 3D bodies. Other example applications of height maps are possible as well.

In some applications involving aspects of the present method, a mobile robotic device may need to navigate with respect to a wall or set of walls. For example, in unloading a trailer filled with boxes, a computing device may need to orient the robot device such that the robotic device can maneuver between walls of a trailer (or other environment that at least partially encloses boxes or other physical objects) as it removes successive facades of boxes. To facilitate correct navigation, the computing device may detect the walls of the trailer and incorporated them into the virtual model of the environment. In other applications, however, a facade of boxes may be reconstructed as a wall for the purposes of navigating the robotic device to a position just in front of the facade.

In accordance with the present method, there may be multiple methods that the computing device can implement for reconstructing walls in the environment. In one method, for instance, depth cameras mounted on a robotic arm and/or on a holonomic cart (or other type of care noted above) may continuously scan the side of the trailer, producing depth images. The computing device may either incorporate such depth images into a volumetric representation to expand the field of view, or may use such depth images directly to facilitate computation of one or more parameters of at least one wall. In either case, the computing device may first filter the depth images based on local orientation in order to keep those 3D points that are oriented in the correct direction for walls with respect to the holonomic cart. The computing device may also filter out 3D points from the depth images that are directly in front of the robotic arm or otherwise out of place with respect to possible walls on the side of the robotic arm. Given a set of 3D points filtered in a manner just described, the computing device may determine a robust plane fit to produce the best plane that fits the 3D points on each side of the robot. Further, this best plane may be used directly in the virtual reconstruction of the environment as a representation of the wall.

In related examples, the walls of the trailer may be corrugated or otherwise may not present a smooth planar surface. In this case, it may be more difficult to do a plane fit reliably. Accordingly, the computing device may implement another type of method for reconstructing walls in the environment that is more robust and that can fit wall representations to depth data that is not planar smooth. With this other method, the computing device may first filter 3D points in the depth images based on their position with respect to the robotic arm (and/or the holonomic cart), keeping only those 3D points that may possibly belong to walls along the sides of the robotic device. Next, the computing device may orthographically project these 3D points onto the floor plane. The floor plane may be divided into a regular grid, and for each grid cell, the computing device may keep track of the number of 3D points that project down to that grid cell. Then, the computing device may fit two straight lines robustly to the floor plane grid cells, one on each side of the robotic arm (and/or the holonomic cart). The fit may be performed with a standard robust regression, discarding outliers, and using the weight of each grid cell as part of the weighting of the robust algorithm. As a result, the computing device may in turn extrude the straight-line fits vertically in order to create a 3D representation of the walls in the virtual environment. Other methods for environment and wall reconstruction are possible as well.

Figure 4A:
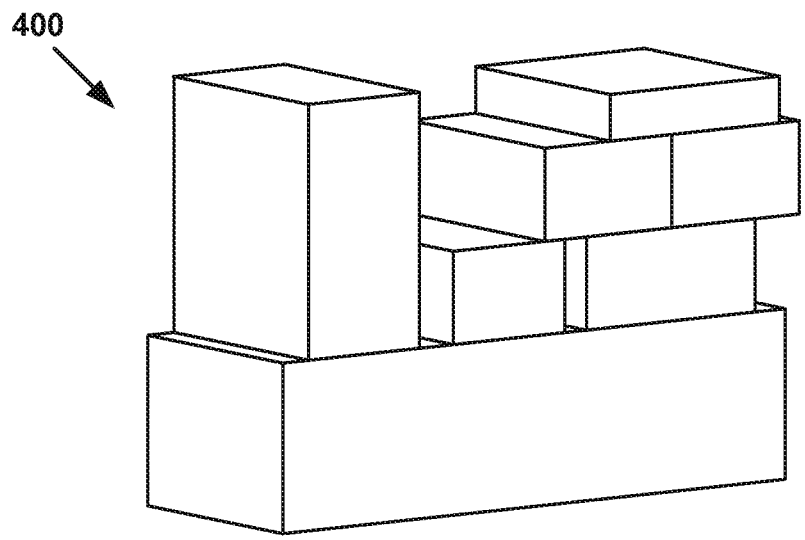
FIGS. 4A-4D illustrate example systems in which functions of the example method can be performed, in accordance with at least some embodiments described herein.
Figure 4B:
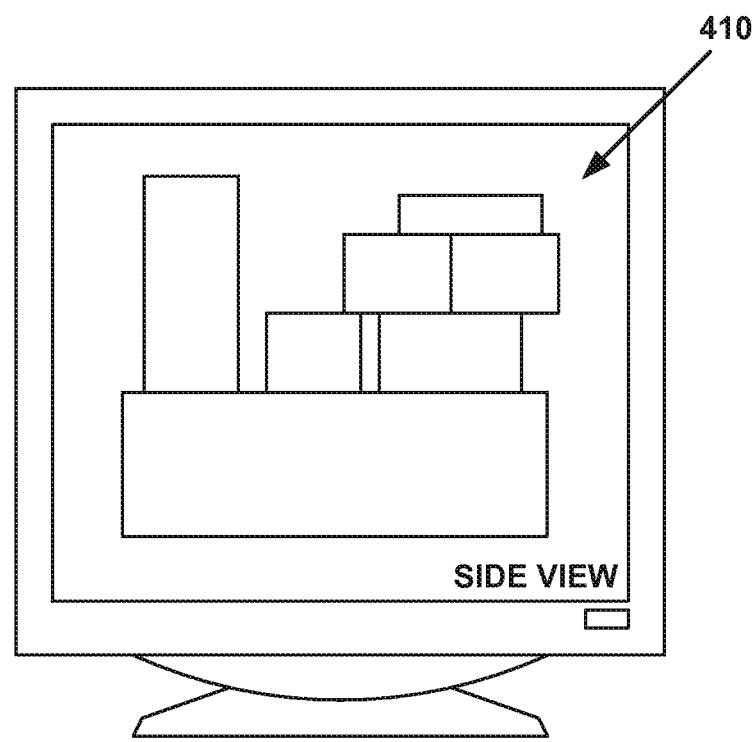

FIGS. 4A-4D illustrate example systems configured to perform functions of the example method, in accordance with at least some embodiments described herein. FIG. 4A illustrates an example stack of boxes 400. Accordingly, FIG. 4B illustrates an example side view facade (i.e., 2D image) of the boxes 410 on a computer screen. The facade of boxes 410 may be determined based on an orthographic projection of a 3D virtual environment corresponding to the stack of boxes 400. As shown, the 3D virtual environment may be projected onto a reference plane orthogonal to the ground on which the boxes 400 are stacked, where the reference plane is also orthogonal to a side view sightline of one or more sensors of a robotic arm (not shown).

Figure 4C:
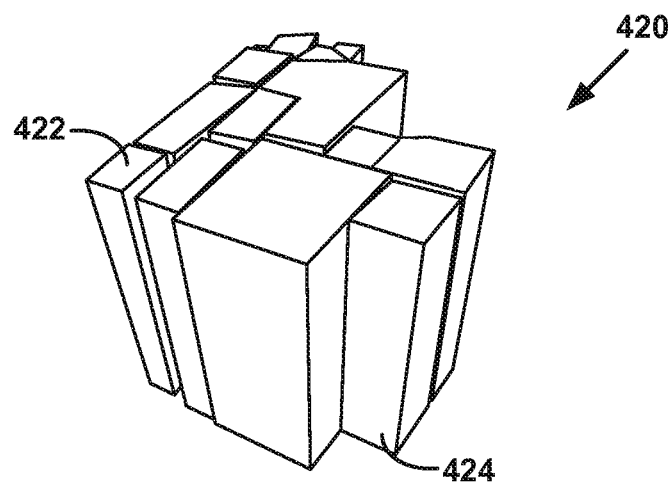
Figure 4D:
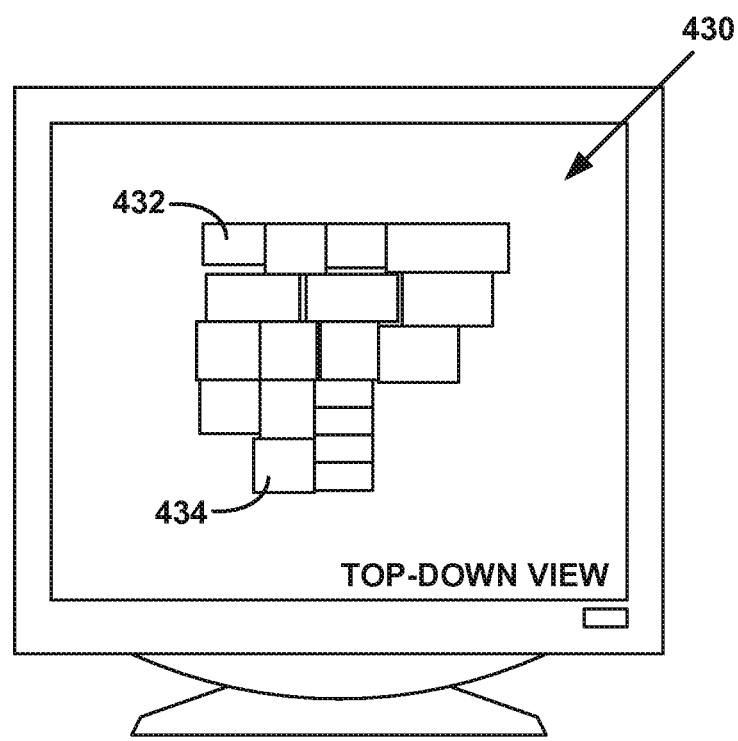

FIG. 4C illustrates another group of boxes 420 that are arranged proximate to each other, but not stacked on top of each other. Accordingly, FIG. 4D illustrates an example top-down view facade of the boxes 430 on a computer screen. FIG. 4D also illustrates various estimates of portions of the facade 430. By comparing the facade 430 with the actual group of boxes 420, it is clear that not all the boundaries of the portions of the facade 430 match the actual shapes of the boxes 420. As shown, the 3D virtual environment of the group of boxes 420 may be projected onto a reference plane parallel to the ground on which the boxes 420 are placed, where the reference plane is also orthogonal to a top-down view sightline of one or more sensors of a robotic arm (not shown).

In examples systems such as that shown in FIGS. 4C and 4D, the computing device may approach moving the boxes 420 in various ways. For instance, after identifying portions of the facade and extruding 3D models based on those portions, the computing device may first move the box 422 associated with portion 432 because that portion closely represents the actual size of the height and width of the corresponding box. If that box is moved first, the boxes next to it may become more distinguishable. Likewise, the computing device could first move the box 424 associated with portion 434, which also closely represents the actual size of the height and width of the corresponding box.

Figure 5A:
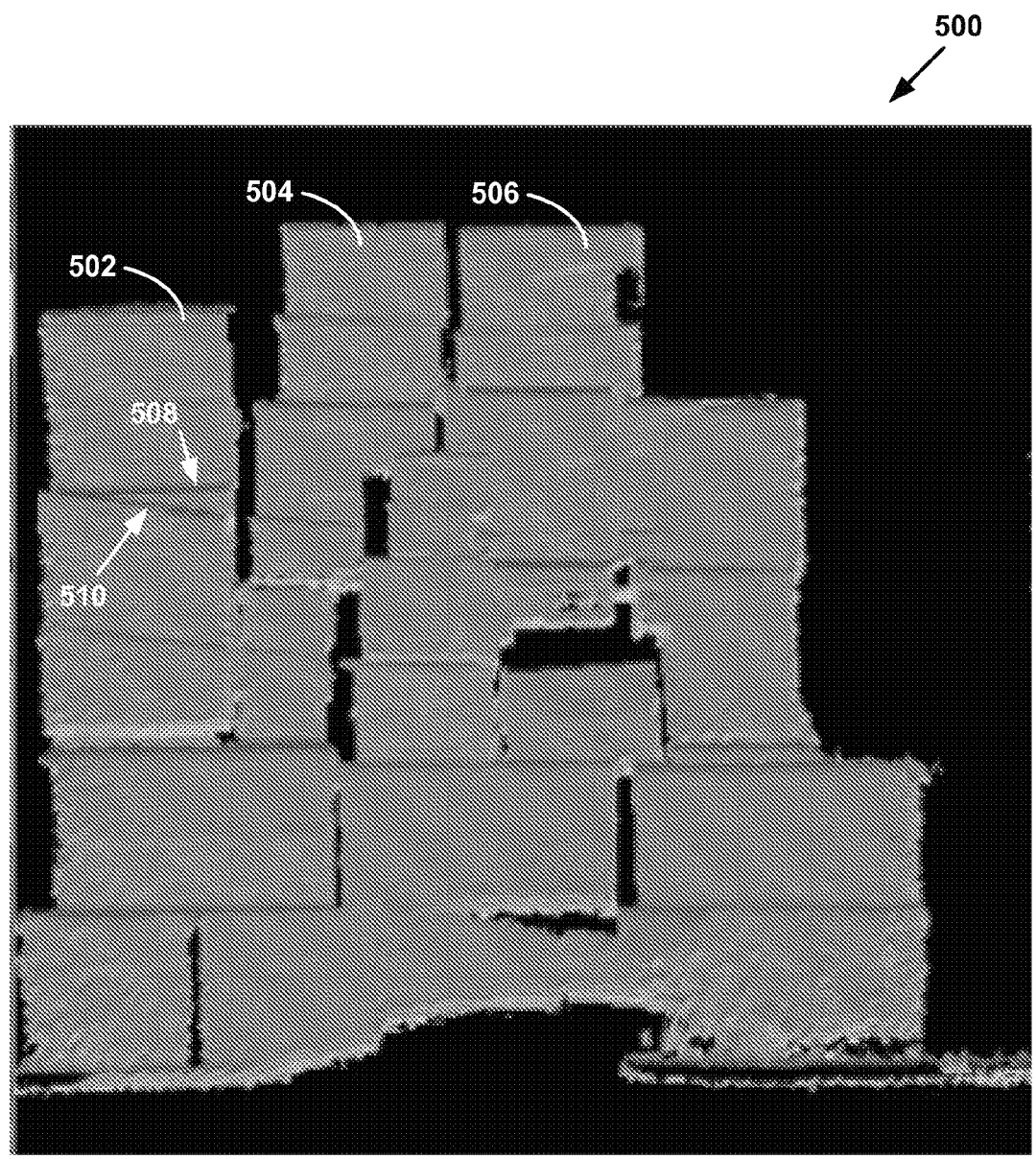
FIGS. 5A-5C illustrate example functions of the example method being performed, in accordance with at least some embodiments described herein.
Figure 5B:
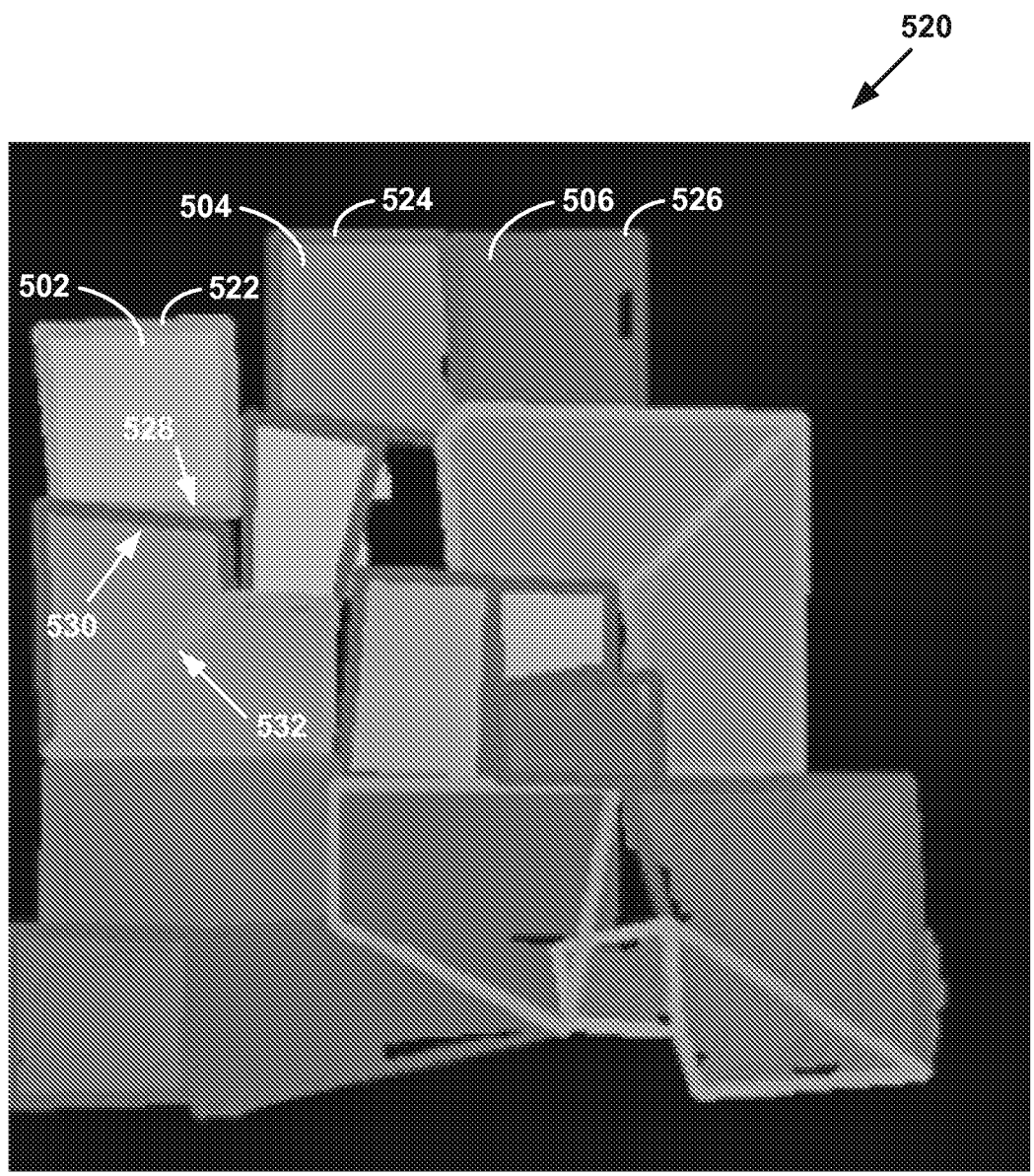
Figure 5C:
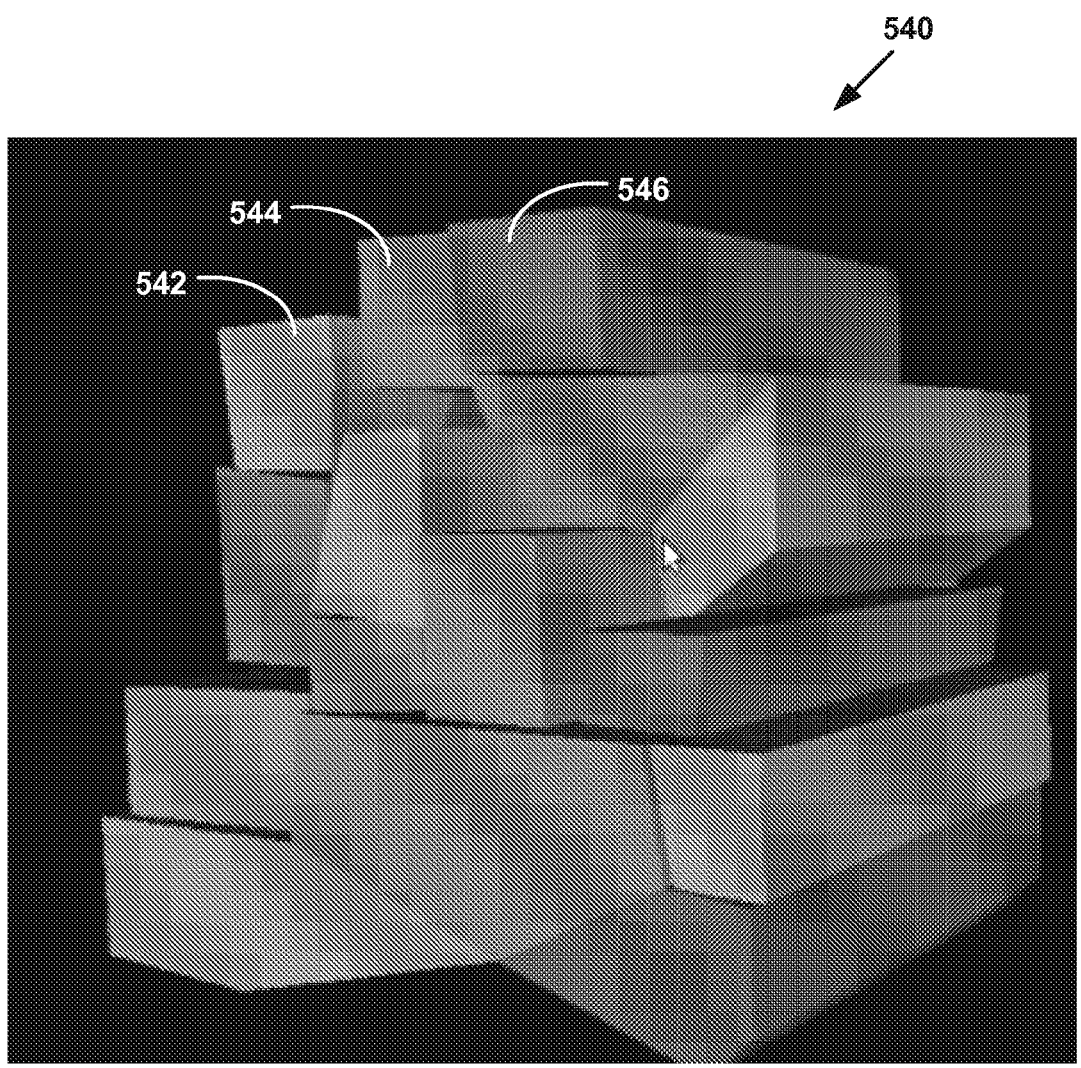

FIGS. 5A-5C illustrate example functions of the example method being performed, in accordance with at least some embodiments described herein. In particular, these figures illustrate example aspects of a strategy for selecting boxes using the 3D and 2D representations described above.

First, FIG. 5A illustrates an example 2D image 500 of a facade of boxes that includes a depth map, with shading indicating the surface indentations of the depth map. In particular, the example 2D image 500 may be a 2D orthographic projection (e.g., of a TSDF volume) created by scanning a camera along a facade of boxes. In a stacked arrangement of boxes such as those shown in the facade, an example strategy may involve which box to select first, and in this case, boxes 502, 504, and 506 may be most ideal to move first due to how distinguishable they are compared to other potential boxes shown in the 2D image 500 and due to how they do not have other boxes on top of them. As such, selecting those boxes and moving those boxes may not disturb the rest of the stack, and thus, boxes 502, 504, and 506 may be selected as candidate boxes. In some examples, further criteria, such as an exposed side (with no other boxes proximate to that side), or a particular box being higher than other boxes, may be used to choose a box (and/or subsequent boxes) to select from the candidates.

As shown, other boxes below boxes 502-506 are more closely proximate to one another and less distinguishable. Further, in a scenario such as that shown in FIG. 5A, the 2D image 500 may include indications of potential edges of boxes 508, 510 which may or may not correspond to box edges. Such uncertainty may arise from occlusion, dropouts, and other viewpoint-related issues with the construction of the virtual environment (i.e., the construction of the volume). It is also clear that there are other portions of the facade which do not have enough information to determine box outlines. When potential edges 508, 510 or other portions of the facade may not, in actuality, be correct identifiers of box edges, the computing device may not use these edges/portions when determining the one or more portions of the 2D image 500.

The facade may also be used in this example strategy to determine what regions of the facade need further information to distinguish boxes. By examining the facade for issues such as occlusion, dropouts, etc., it is possible to determine regions that need further scanning to make decisions about boxes to be picked. Removing a box may also provide an opportunity to get more information about the facade, which had been hidden by the box being removed.

As described above, the facade may also functions to create a set of 3D convex bodies to determine collisions for a path planner of a robotic manipulator, for instance. FIG. 5B illustrates an image 520 similar to the 2D image 500 of FIG. 5A resulting from one iteration of the computing device determining one or more portions of that 2D image 500. In particular, the computing device may segment the facade into planar regions, and then each region is further segmented into convex sub-regions. As shown, the computing device may determine portions 522, 524, and 526 which correspond to boxes 502, 504, and 506, respectively, where edges of portions 522, 524, and 526 are similar to edges shown in the depth map of the 2D image 500. In particular, edge 528 of portion 522 corresponds to the potential edge 508 of box 502, though edge 530, which corresponds to the potential edge 510, is also determined to be an edge of another determined portion. Also, edges such as edge 532, though not likely an actual edge of a box in the physical environment, may be determined, perhaps due to a recognizable fold or other feature of a box that resembles the form of edge 532.

In FIG. 5B, the facade is segmented into planar regions, and then each region is further segmented into convex sub-regions. Each of the sub-regions can then be extruded along its normal to create a set of 3D convex bodies, shown in FIG. 5C. These convex bodies are then used for collision detection during the planning process.

Lastly, FIG. 5C illustrates a 3D representation 540 of the one or more portions of image 520. In particular, each of the sub-regions noted above with respect to FIG. 5B may be extruded along its normal to create a set of 3D convex bodies. The computing device may then use these convex bodies for collision detection during the planning process.

Accordingly, as shown, each portion of image 520 has been extruded out as a convex 3D model, including fairly box-shaped 3D model representations 542, 544, and 546 corresponding to portions 522, 524, 526, respectively, and to boxes 502, 504, and 506, respectively. As shown, each extruded 3D model varies in length, and the extrusion length of each 3D model may be determined in accordance with one or more of the factors noted above, such as a predetermined average length of the boxes. After the 3D representation 540 is determined, any one of 3D models 542, 544, and 546 may be selected to be moved by a robotic manipulator based on the likelihood that they accurately resemble the actual size and shape of boxes 502, 504, or 506. By moving one of those boxes, boxes below those may become more distinguishable in subsequent 2D images and 3D representations, as boxes may be moved one by one from the stack from top to bottom. Alternatively, subsequent portions and corresponding 3D representations of those portions may be determined before the computing device determines which box to select for movement.

Figure 6A:
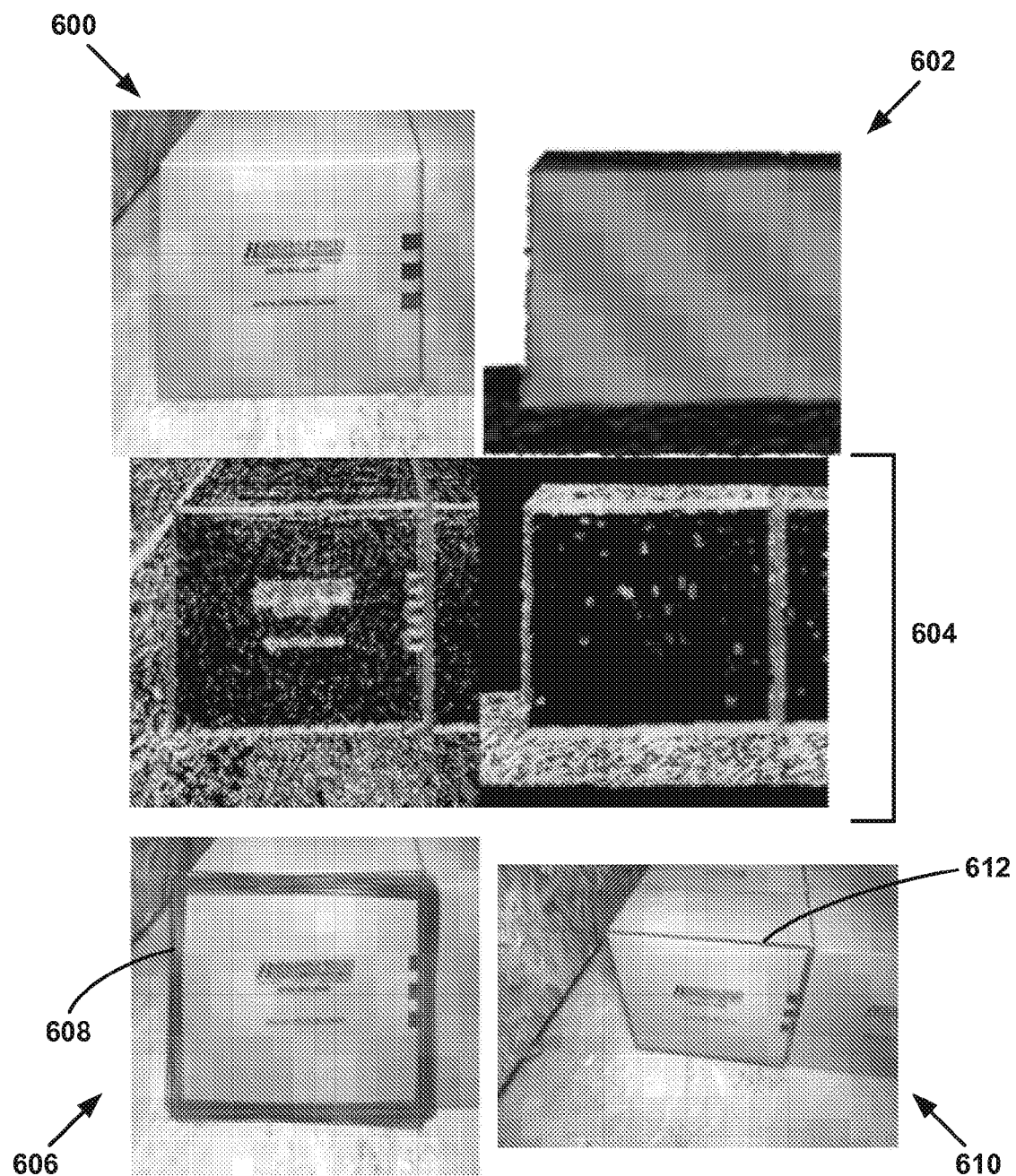
FIGS. 6A-6B illustrate other example functions of the example method being performed, in accordance with at least some embodiments described herein.
Figure 6B:
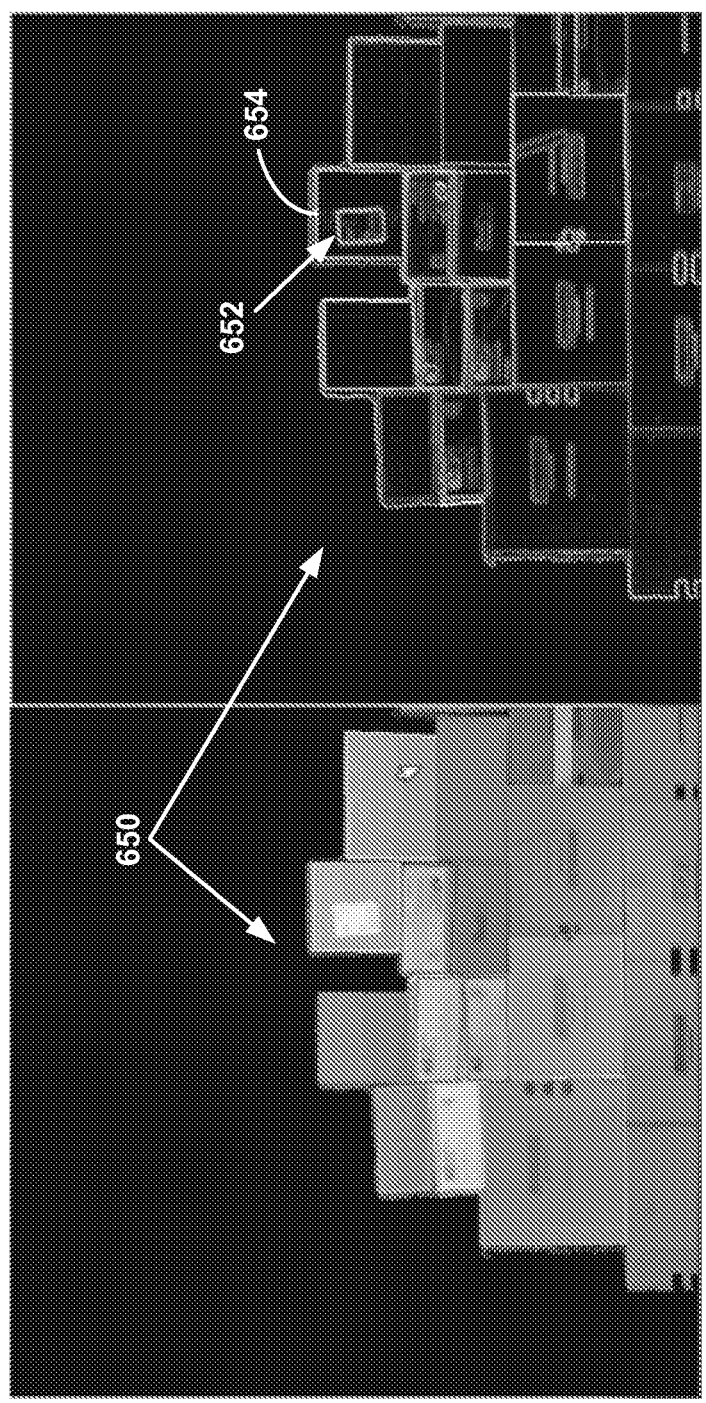

FIGS. 6A and 6B illustrate example aspects of a strategy for picking boxes using the 3D and 2D representations described above, and may serve as further aspects of the strategy described with respect to FIGS. 5A-5C.

In addition to the facade volume described above with respect to FIG. 5A, there may also be smaller volumes with finer resolution for detecting boxes or other 3D objects using templates. FIG. 6A illustrates example projections from a smaller, high resolution TSDF. The top two images are the orthographic projection of the visual 600 and depth 602 maps. The middle two images 604 show features extracted from the images. Here, straight line segments are the main feature that is used here to detect parallelogram structures (i.e., "portions"), although other features may be used in addition to or alternatively to straight line segments in this example or other examples not described herein. The bottom left image 606 shows a set of templates that delineate the parallelogram that is extracted from the line segments; the best-fit template 608 is highlighted. As shown in the bottom right image 610, the best-fit template 608 is altered 612 and projected back to an original view of the box, identifying the face of the box.

In some example implementations, the computing device may also scan larger regions at high resolution to detect boxes or other physical objects. FIG. 6B illustrates a set of boxes 650 that may be detected, in accordance with at least some embodiments described herein. In this example, physical constraints among the boxes may be used to remove box detection hypotheses that do not fit into an overall configuration of boxes. For instance, although a label 652 that is coupled to a surface of one of the topmost boxes is detected as a parallelogramatic structure, that label 652 may not be identified as a box because there is a stronger-confidence hypothesis for the parallelogramatic structure 654 that encloses the label.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining one or more two-dimensional (2D) images of a plurality of physical objects in a physical environment of a robotic manipulator;
   determining one or more portions of the one or more 2D images corresponding to a given one or more physical objects of the plurality, wherein the one or more portions virtually distinguish a boundary of at least one distinct object of the given one or more physical objects from boundaries of other physical objects of the given one or more physical objects;
   determining 3D models corresponding to respective determined portions of the one or more 2D images, each 3D model comprising predicted dimensions of a respective physical object of the given one or more physical objects, the predicted dimensions being based on the respective determined portion of the one or more 2D images that corresponds to the respective physical object and further based on dimensions of one or more other physical objects of the plurality;
   based on the determined 3D models, selecting a particular physical object from the given one or more physical objects; and
   providing an instruction to the robotic manipulator to move the particular physical object.

2. The method of claim 1, wherein the one or more other physical objects of the plurality are one or more physical objects of the plurality that were previously moved by the robotic manipulator.

3. The method of claim 1, wherein determining the 3D models comprises determining at least one 3D model having predicted dimensions that fall within a predetermined range of dimensions of the one or more other physical objects, and
   wherein the predetermined range of dimensions is bound by one or more of: a minimum height of the one or more other physical objects, a minimum length of the one or more other physical objects, a minimum width of the one or more other physical objects, an average height of the one or more other physical objects, an average length of the one or more other physical objects, an average width of the one or more other physical objects, a maximum height of the one or more other physical objects, a maximum length of the one or more other physical objects, and a maximum width of the one or more other physical objects.

4. The method of claim 1, wherein the one or more 2D images include respective 2D depth maps representative of distances between respective surfaces of the plurality of physical objects and a reference plane associated with a perspective of one or more sensors, and
   wherein determining the 3D models is further based on portions of the 2D depth maps associated with the given one or more physical objects.

5. The method of claim 1, wherein the determined one or more 2D images include one or more 2D orthographic projections of a 3D virtual environment representative of the physical environment.

6. The method of claim 1, wherein respective 3D models of the determined 3D models include two parallel surfaces of an identical shape, wherein the shape is a shape of the respective determined portion of the one or more 2D images to which the respective 3D model corresponds.

7. The method of claim 1, wherein determining the one or more portions of the one or more 2D images comprises determining the one or more portions based on templates corresponding to known polygonic shapes so that the one or more portions include dimensions of the known polygonic shapes.

8. The method of claim 1, further comprising:
   refining one or more of the determined 3D models based on templates corresponding to known 3D geometric shapes so that the one or more refined 3D models include dimensions of the known 3D geometric shapes,
   wherein selecting the particular physical object from the given one or more physical objects is based on the one or more refined 3D models.

9. A non-transitory computer readable medium having stored thereon instructions that, upon execution by a computing device, cause the computing device to perform functions comprising:
   determining one or more two-dimensional (2D) images of a plurality of physical objects in a physical environment of a robotic manipulator;
   determining one or more portions of the one or more 2D images corresponding to a given one or more physical objects of the plurality, wherein the one or more portions virtually distinguish a boundary of at least one distinct object of the given one or more physical objects from boundaries of other physical objects of the given one or more physical objects;
   determining 3D models corresponding to respective determined portions of the one or more 2D images, each 3D model comprising predicted dimensions of a respective physical object of the given one or more physical objects, the predicted dimensions being based on the respective determined portion of the one or more 2D images that corresponds to the respective physical object and further based on dimensions of one or more other physical objects of the plurality;
based on the determined 3D models, selecting a particular physical object from the given one or more physical objects; and
providing an instruction to the robotic manipulator to move the particular physical object.

10. The non-transitory computer readable medium of claim 9, wherein the plurality of physical objects comprises a pallet of stacked physical objects within the physical environment,
wherein the one or more 2D images include one or more of: at least one 2D projection associated with a side view of the pallet of stacked physical objects and at least one 2D projection associated with a top-down view of the pallet of stacked physical objects, and
wherein selecting the particular physical object from the given one or more physical objects comprises selecting, as the particular physical object, an object on a top row of the pallet of stacked physical objects closest in proximity to the robotic manipulator.

11. The non-transitory computer readable medium of claim 9, wherein selecting the particular physical object from the given one or more physical objects based on the determined 3D models comprises selecting a physical object corresponding to a 3D model that includes at least three surfaces different from surfaces of the 3D model that are proximate to surfaces of other 3D models of the determined 3D models.

12. The non-transitory computer readable medium of claim 9, the functions further comprising:
based on dimensions of a determined 3D model that corresponds to the particular physical object, determining a location on the particular physical object at which to instruct the robotic manipulator to initiate movement of the particular physical object,
wherein providing the instruction to the robotic manipulator to move the particular physical object comprises providing an instruction to the robotic manipulator to initiate movement of the particular physical object by the robotic manipulator contacting the particular physical object at the determined location on the particular physical object.

13. The non-transitory computer readable medium of claim 9, wherein the one or more other physical objects of the plurality are one or more physical objects of the plurality that were previously moved by the robotic manipulator, the functions further comprising:
determining a range of dimensions of the one or more physical objects of the plurality that were previously moved by the robotic manipulator,
wherein determining the one or more portions of the one or more 2D images is based on the determined range of dimensions of the one or more physical objects of the plurality that were previously moved by the robotic manipulator, and
wherein the predicted dimensions being based on the dimensions of the one or more physical objects of the plurality that were previously moved by the robotic manipulator comprises the predicted dimensions being based on the determined range of dimensions of the one or more physical objects of the plurality that were previously moved by the robotic manipulator.

14. A system comprising:
a robotic manipulator;
at least one processor; and
data storage comprising instructions executable by the at least one processor to cause the system to perform functions comprising:
determining one or more two-dimensional (2D) images of a plurality of physical objects in a physical environment of the robotic manipulator;
determining one or more portions of the one or more 2D images corresponding to a given one or more physical objects of the plurality, wherein the one or more portions virtually distinguish a boundary of at least one distinct object of the given one or more physical objects from boundaries of other physical objects of the given one or more physical objects;
determining 3D models corresponding to respective determined portions of the one or more 2D images, each 3D model comprising predicted dimensions of a respective physical object of the given one or more physical objects, the predicted dimensions being based on the respective determined portion of the one or more 2D images that corresponds to the respective physical object and further based on dimensions of one or more other physical objects of the plurality;
based on the determined 3D models, selecting a particular physical object from the given one or more physical objects; and
providing an instruction to the robotic manipulator to move the particular physical object.

15. The system of claim 14, further comprising one or more sensors, wherein the one or more 2D images include respective 2D depth maps representative of distances between respective surfaces of the plurality of physical objects and a reference plane associated with a perspective of the one or more sensors,
wherein at least one edge of a respective determined portion is determined based on boundaries between substantially proximate physical objects, and
wherein the boundaries are indicated by one or more of the 2D depth maps.

16. The system of claim 14, wherein determining the one or more portions of the one or more 2D images comprises determining at least one portion of the one or more 2D images having at least one edge that falls within a predetermined range of dimensions of the plurality of physical objects,
wherein determining the 3D models comprises determining at least one 3D model having predicted dimensions that fall within the predetermined range of dimensions of the plurality of physical objects, and
wherein the predetermined range of dimensions of the plurality of physical objects is bound by one or more of: a minimum height of the plurality of physical objects, a minimum length of the plurality of physical objects, a minimum width of the plurality of physical objects, an average height of the plurality of physical objects, an average length of the plurality of physical objects, an average width of the plurality of physical objects, a maximum height of the plurality of physical objects, a maximum length of the plurality of physical objects, and a maximum width of the plurality of physical objects.

17. The system of claim 14, wherein determining the 3D models is further based on templates representative of known 3D models, the functions further comprising:
determining one or more features on the 3D model that corresponds to the selected particular physical object based on corresponding marked features in a given template representative of a known 3D model that was used to determine the 3D model that corresponds to the selected particular physical object, wherein providing the instruction to the robotic manipulator to move the particular physical object comprises providing the instruction to the robotic manipulator to move the particular physical object based on the determined one or more features.

18. The system of claim 14, wherein the plurality of physical objects include cuboid-shaped physical objects, and wherein determining the one or more portions of the one or more 2D images comprises determining one or more substantially quadrilateral portions of the one or more 2D images.

19. The system of claim 14, further comprising one or more sensors, wherein the physical environment includes one or more walls at least partially surrounding the plurality of physical objects, the functions further comprising:

receiving data from the one or more sensors, the data including a plurality of 3D data points associated with the physical environment; and determining one or more portions of the 3D data points representative of locations in the physical environment that exceed a threshold distance from the robotic manipulator and are substantially proximate to the one or more walls in the physical environment, wherein providing the instruction to the robotic manipulator to move the particular physical object is based on the determined one or more portions of the 3D data points and comprises providing an instruction to the robotic manipulator to move the particular physical object while avoiding physical contact between the robotic manipulator and the one or more walls and between the particular physical object and the one or more walls.

20. The system of claim 14, further comprising one or more sensors, wherein the physical environment includes one or more walls at least partially surrounding the plurality of physical objects, the functions further comprising:

receiving data from the one or more sensors, the data including a plurality of 3D data points associated with the physical environment;

determining one or more portions of the 3D data points representative of locations in the physical environment that exceed a threshold distance from the robotic manipulator and are substantially proximate to the one or more walls in the physical environment;

determining one or more 2D orthographic projections of the one or more portions of the 3D data points; and based on the one or more 2D orthographic projections, determining one or more 3D models associated with respective 2D orthographic projections and representative of the one or more walls in the physical environment, wherein providing the instruction to the robotic manipulator to move the particular physical object is based on the determined one or more 3D models representative of the one or more walls and comprises providing an instruction to the robotic manipulator to move the particular physical object while avoiding physical contact between the robotic manipulator and the one or more walls and between the particular physical object and the one or more walls.

\* \* \* \* \*